United States Patent [19]

Morita et al.

[11] Patent Number: 5,302,007
[45] Date of Patent: Apr. 12, 1994

[54] REAR WHEEL BRAKING FORCE CONTROL METHOD AND AN APPARATUS THEREFOR

[75] Inventors: Takao Morita, Toyota; Tsutomu Matsukawa, Okazaki; Hiromichi Yasunaga, Okazaki; Tadao Tanaka, Okazaki; Akihiko Togashi; Yasutaka Taniguchi, Hoi; Masanori Tani, Okazaki, all of Japan

[73] Assignee: Mitsubishi Jidosha Kogue Kabushiki Kaisha, Tokyo, Japan

[21] Appl. No.: 983,468

[22] Filed: Nov. 30, 1992

[30] Foreign Application Priority Data

Nov. 30, 1991 [JP] Japan .................. 3-317174

[51] Int. Cl.$^5$ .......................... B60T 8/30; B60T 8/24; B60T 8/26
[52] U.S. Cl. ................. 303/9.73; 303/113.5
[58] Field of Search ............ 303/9.62, 9.63, 9.67–9.73, 303/22.1, 22.4.113.4, 113.5, 115.1

[56] References Cited

U.S. PATENT DOCUMENTS

| | | | |
|---|---|---|---|
| 4,564,244 | 1/1986 | Reinartz et al. | 303/9.73 |
| 4,755,008 | 7/1988 | Imoto et al. | 303/22.1 X |
| 4,795,219 | 1/1989 | Brearley et al. | 303/22.1 X |
| 5,147,113 | 9/1992 | Nisonger et al. | 303/9.73 |
| 5,176,432 | 1/1993 | Burgdorf et al. | 303/113.5 X |

FOREIGN PATENT DOCUMENTS

| | | |
|---|---|---|
| 0210335A3 | 2/1987 | European Pat. Off. . |
| 0392815A1 | 10/1990 | European Pat. Off. . |
| 3527455A1 | 2/1986 | Fed. Rep. of Germany . |
| 3436223A1 | 4/1986 | Fed. Rep. of Germany . |
| 3440541A1 | 5/1986 | Fed. Rep. of Germany . |
| 3702682C1 | 6/1988 | Fed. Rep. of Germany . |
| 3941409C1 | 4/1991 | Fed. Rep. of Germany . |
| 4141875A1 | 6/1992 | Fed. Rep. of Germany . |
| 4141877A1 | 6/1992 | Fed. Rep. of Germany . |
| 2611358A1 | 9/1988 | France . |
| 1-257652 | 10/1989 | Japan . |
| 3-125657 | 5/1991 | Japan . |
| 3-208760 | 9/1991 | Japan . |

*Primary Examiner*—Robert J. Oberleitner
*Assistant Examiner*—Alfred Muratori

[57] ABSTRACT

When a master cylinder pressure detected by way of a pressure sensor (74) attains a level not lower than a target pressure ($P_{OK}$), normally-open on-off valves (62, 63) for by-passing proportioning control valves ($57_1$, $57_2$) are opened. If the slip factor of rear wheels, calculated by way of a slip factor calculation section (121), is not lower than a predetermined value, the on-off valves (64, 66) are opened to allow the rear wheel cylinder pressure to escape to accumulators (65, 67). Thus, if there is enough room for the increase of the braking force on the rear wheels, the rear wheel braking force can be increased to reduce the share of the front wheel braking force, depending on braking conditions, such as the road surface conditions, vehicle running conditions, etc. Further the rear wheels can be prevented from being locked.

28 Claims, 21 Drawing Sheets

|  | AIR TEMPERATURE T | | |
|---|---|---|---|
| WINDSHIELD WIPER OPERATION CYCLE Tp | | S | M | N |
| S | BD | MD | MD |
| M | BD | MD | ZO |
| N | MD | ZO | ZO |

RULE 1 ADAPTATION DEGREE

REAR WHEEL BRAKING FORCE CONTROL METHOD AND AN APPARATUS THEREFOR

BACKGROUND OF THE INVENTION

The present invention relates to a rear wheel braking force control method for controlling the distribution of front and rear wheel braking forces and an apparatus therefor. More particularly, it relates to a rear wheel braking force control method and an apparatus therefor, capable of reducing the share of the front wheel braking force without causing the rear wheels to be locked.

In a typical braking system of a vehicle, a brake fluid pressure (hereinafter referred to as master cylinder pressure), which is produced in a master cylinder in response to a driver's depression of a brake pedal, is transmitted to wheel cylinders for the four wheels of the vehicle, whereby a braking force is applied to each wheel. If a large braking force acts on each wheel in response to a deep depression of the brake pedal, while the vehicle furnished with the braking system of this type is running, the deceleration of the vehicle becomes higher to reduce the rear wheel load, so that the ground contact performance of the rear wheels is lowered. If the master cylinder fluid pressure is distributed substantially equally to the front and rear wheel cylinders with the ground contact performance of the rear wheels thus lowered, the rear wheels are locked first, so that the braking stability of the vehicle is deteriorated.

Conventionally, in order to avoid the deterioration of the braking stability due to the rear-wheel-first locking, proportioning control valves (PCVs) are incorporated in the braking system. For example, each of two PCVs is disposed in the middle of a duct which connects each corresponding one of fluid pressure generator sections of the master cylinder and its corresponding rear wheel. The PCVs transmit the master cylinder pressure directly to the wheel cylinders for the rear wheels if the braking force is small. If the master cylinder pressure attains a level not lower than a set pressure, however, the PCVs lower the rate of increase of the fluid pressure transmitted to the rear wheel cylinders.

Thus, in the braking system furnished with the PCVs, the rear wheel braking force increases at a high rate as the front wheel braking force increases, in a small braking force region where the input fluid pressure to the PCVs is not higher than a set pressure. In a large braking force region where the input fluid pressure to the PCVs is higher than the set pressure, however, the rear wheel braking force increases at a low rate as the front wheel braking force increases. In other words, if a curve indicative of the braking force distribution characteristics of the braking system furnished with the PCVs is drawn on a graph whose axes of ordinate and abscissa represent the rear wheel braking force and front wheel braking force, respectively, then this braking force distribution curve is composed of a first straight line with a large inclination, which corresponds to the small braking force region, and a second straight line with a small inclination, which corresponds to the large braking force region.

The braking force distribution characteristics of the conventional braking system are set so that the braking force distribution ratio for the rear wheels is lower than in the case of a braking force distribution (ideal braking force distribution) such that the four wheels are simultaneously locked when the vehicle is braked. In this manner, the braking force stability is prevented from being lowered by the rear-wheel-first locking. Thus, the conventional braking force distribution curve is situated closer to the axis of abscissa than an ideal braking force distribution curve, that is, the rear wheel braking force is always smaller than the ideal braking force. Meanwhile, the rear wheels cannot always be locked if they are subjected to a braking force of a value greater than a value which is determined by the conventional or ideal braking force distribution curve. In other words, even if there is enough room for the increase of the rear wheel braking force, the conventional braking system produces an overall braking force by increasing the share of the front wheel braking force correspondingly.

If the share of the front wheel braking force is excessively increased in this manner, wear of braking pads of a front wheel brake unit is increased, and besides, heat release from the brake increases. Accordingly, the braked vehicle is liable to nose dive, as well as a fade, such that the friction coefficient of the brake pads is suddenly reduced, and a vapor lock, which is attributable to an increase of the brake fluid temperature, occurs. Thus, the braking stability is lowered.

If the share of the rear wheel braking force is increased, however, the rear wheels liable to become locked, so that their locking should be prevented. In consideration of these circumstances, systems which are designed so that the rear wheel braking force distribution can be increased without causing the rear wheels to be locked are disclosed in Published Unexamined Japanese Patent Application Nos. 1-257652 (DE3742173, FR2624462, or GB2213543), 3-125657 (GB2236156 or DE3931858), and 3-208760 (DE4029332, GB2238092, or FR2654401). These conventional systems are provided with an anti-lock device and solenoid-operated valves for normally neutralizing the action of the proportioning control valves, so that the rear wheels can be prevented from locking while enjoying an increase of the braking force distribution thereto.

In these conventional examples, however, the proportioning control valves can be actuated only in case of trouble of the anti-lock device, so that they cannot fulfill their functions. Thus, the braking force cannot be properly distributed to the rear wheels. Since the expensive anti-lock device is a vital necessity, moreover, the system is inevitably expensive as a whole.

OBJECT AND SUMMARY OF THE INVENTION

Accordingly, the object of the present invention is to provide a rear wheel braking force control method and an apparatus therefor at low costs, in which the distribution of a braking force to rear wheels is controlled in accordance with the braking conditions of a vehicle so that the braking performance and stability can be improved by enhancing the braking force distribution to the rear wheels if there is enough room for the increase of the braking force on the rear wheels, and the rear wheel braking force can be reduced to prevent the rear wheels from being locked without requiring use of an anti-lock device.

According to one aspect of the present invention, there is provided a rear wheel braking force control method for a vehicle, for controlling the operation of at least one solenoid-operated valve arranged in a first passage connecting a master cylinder and wheel cylinders for rear left and right wheels of the vehicle, the at least one solenoid-operated valve being operable to selectively make the action of at least one proportioning control valve effective or ineffective, the at least one proportioning control valve being provided in the first passage and operable to control a wheel cylinder pressure so that the rate of increase of the wheel cylinder pressure is lower than that of a master cylinder pressure, and for controlling the operation of a reducing valve for selectively allowing or preventing the communication between a reservoir and a second passage constituting a part of the first passage and connecting the wheel cylinders and the at least one proportioning control valve.

This rear wheel braking force control method comprises a process for detecting the degree of braking to which the vehicle is braked, a process for detecting braking conditions of the vehicle which influence the level of the locking limit of at least one of the rear wheels, a process for detecting a tendency for the at least one rear wheel to be locked, a process for determining a set braking degree in accordance with the level of the locking limit of the at least one rear wheel discriminated by the braking conditions detected in the braking condition detecting process, a distribution control process for actuating the at least one solenoid-operated valve so that the action of the at least one proportioning control valve is made ineffective when the braking degree detected in the braking degree detecting process is lower than the set braking degree, and for actuating the at least one solenoid-operated valve so that the action of the at least one proportioning control valve is made effective when the detected braking degree is higher than the set braking degree, and a pressure reduction control process for keeping the reducing valve closed in a normal state and for opening the reducing valve when the tendency for the at least one rear wheel to be locked is detected in the locking tendency detecting process.

According to another aspect of the present invention, there is provided a rear wheel braking force control apparatus for a vehicle, which has at least one proportioning control valve arranged in a first passage connecting a master cylinder and wheel cylinders for rear left and right wheels of the vehicle for controlling a wheel cylinder pressure so that the rate of increase of the wheel cylinder pressure is lower than that of a master cylinder pressure, at least one solenoid-operated valve provided in the first passage for selectively making the pressure control action of the at least one proportioning control valve effective or ineffective, and control means for controlling the operation of the at least one solenoid-operated valve.

This rear wheel braking force control apparatus comprises means for detecting the degree of braking to which the vehicle is braked, means for detecting braking conditions of the vehicle which influence the level of the locking limit of the at least one rear wheel, means for detecting a tendency for the at least one rear wheel to be locked, a reservoir communicating with a second passage constituting a part of the first passage and connecting the wheel cylinders and the at least one proportioning control valve, and a reducing valve for selectively allowing or preventing the communication between the second passage and the reservoir. The control means determines a set braking degree in accordance with the level of the locking limit of the at least one rear wheel discriminated by the detection output of the braking condition detecting means. Further, the control means actuates the at least one solenoid-operated valve so that the action of the at least one proportioning control valve is made ineffective when the braking degree detected by means of the braking degree detecting means is lower than the set braking degree, and actuates the at least one solenoid-operated valve so that the action of the at least one proportioning control valve is made effective when the detected braking degree is higher than the set braking degree. Furthermore, the control means keeps the reducing valve closed in a normal state, and opens the reducing valve when the tendency for the at least one rear wheel to be locked is detected by means of the locking tendency detecting means.

An advantage of the invention lies in that if there is enough room for the increase of the braking force on the rear wheels, the rear wheel braking force can be increased to reduce the share of the front wheel braking force, depending on the braking conditions, such as the road surface conditions, vehicle running conditions, etc. Accordingly, wear of a front wheel brake unit can be reduced so that the interval of replacement of the brake pads is extended. Also, heat release from the front wheel brake unit is reduced so that the anti-fade properties and reliability are improved, and the possibility of nose diving is lowered so that the braking stability is improved. If the master cylinder pressure is high, or if the locking limit of the rear wheels is low, moreover, the proportioning control valves are actuated. If the slip factor of the rear wheels is high, furthermore, the rear wheel cylinder pressure is reduced. Thus, the rear wheels can be prevented from being locked.

DETAILED DESCRIPTION

First, the conventional braking system will be described in detail.

Figure 10:
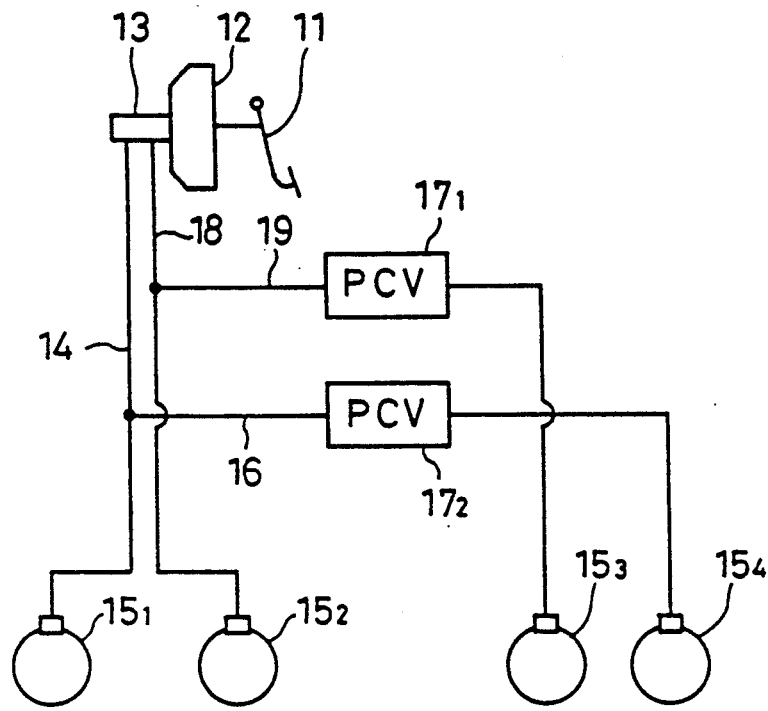
FIG. 10 is a schematic view showing a conventional braking system.

Referring to FIG. 10, the conventional X-piping braking system for general use in an FF car is provided with a brake pedal 11. A treading force on the brake pedal 11 is amplified by means of an intensifier 12, and then transmitted to a master cylinder 13 of a tandem. The master cylinder 13 includes two fluid pressure generator sections (not shown) for generating a brake fluid pressure corresponding to the depth of depression of the brake pedal 11. One of the fluid pressure generator sections is connected to a wheel cylinder $15_1$ for a front left wheel by means of a duct 14, and is also connected to a wheel cylinder $15_4$ for a rear right wheel by means of a duct 16 which diverges from the middle of the duct 14. A PCV $17_2$ is disposed in the middle of the duct 16. The other fluid pressure generator section is connected to a wheel cylinder $15_2$ for a front right wheel by means of a duct 18, and is also connected to a wheel cylinder $15_3$ for a rear left wheel by means of a duct 19 which diverges from the middle of the duct 18. A PCV $17_1$ is disposed in the middle of the duct 19.

The PCVs $17_1$ and $17_2$ are proportioning control valves which directly transmit a fluid pressure produced in the master cylinder 13 unless the fluid pressure is higher than a set pressure. In a pressure range exceeding the set pressure, however, the PCVs $17_1$ and $17_2$ lower the rate of increase of the fluid pressure for the rear wheels, which accompanies an increase of the master cylinder 13, thereby establishing a bent-line relationship between the front and rear wheel braking forces. These valves are conventional ones.

Figure 12:
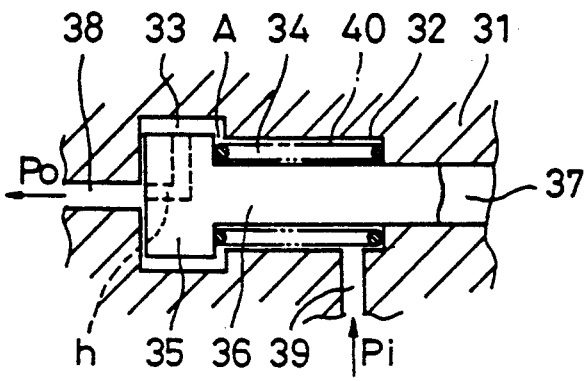
FIG. 12 is a sectional view illustrating an operating state of the proportioning control valve.
Figure 13:
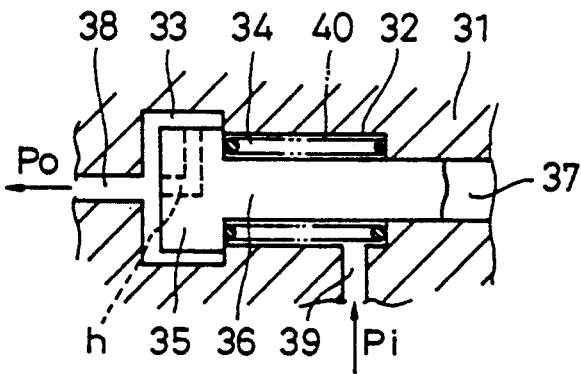
FIG. 13 is a sectional view illustrating another operating state of the proportioning control valve.

As shown in FIGS. 12 and 13, each of the PCVs $17_1$ and $17_2$ includes a valve housing 31. Defined in the housing 31 is a stepped cylindrical valve chamber 32 which is formed of large- and small-diameter chambers 33 and 34. An outlet port 38, through which the fluid pressure to be supplied to the wheel cylinders is taken out, is formed in the housing 31, opening to one end face of the cylinder chamber 33 in the housing 31. Also, an inlet port 39, through which the fluid pressure from the master cylinder 13 is taken in, is formed opening to one side of the peripheral surface of the cylinder chamber 34. A cylindrical valve plug 35, having a diameter a little greater than that of the cylinder chamber 34, is disposed in the cylinder chamber 33 for axial movement. A hole h is bored through the valve plug 35. Two opposite ends of the hole h open individually to the outer peripheral surface and the outlet-side end face of the plug 35 so that hydraulic oil can flow through the hole h. A plunger 36, which is formed integrally with the valve plug 35, extends along the valve axis in the cylinder chamber 34. One end portion of the plunger 36 is slidably fitted in a guide hole 37, which is bored through the housing 31.

Two opposite ends of a spring 40 in the cylinder chamber 34 individually engage one end face of the valve plug 35 and that portion of the housing 31 which defines the end face of the chamber 34, thereby continually urging the plug 35 toward the outlet port 38. Normally, therefore, a gap A is defined between the peripheral edge portion of the valve plug 35 and the end portion of the cylinder chamber 34, so that the valve is open. Thus, an input fluid pressure Pi is transmitted as an output fluid pressure Po through the gap A and the hole h.

If the pressure receiving areas on the sides of the outlet port 38 of the valve plug 35 and the cylinder chamber 34 are So and Si, respectively, and if the urging force of the spring 40, input fluid pressure, and output fluid pressure are F, Pi, and Po, respectively, the valve plug 35 moves horizontally, depending on the relation between "Pi·Si+F" and "Po·So." In an initial state ("Po·So"<"Pi·Si+F"), as mentioned before, the gap A is opened by the urging force of the spring 40, so that the input fluid pressure Pi is delivered directly as the output fluid pressure Po. Thus, the output fluid pressure Po increases in accordance with the depth of depression of the brake pedal 11.

Figure 14:
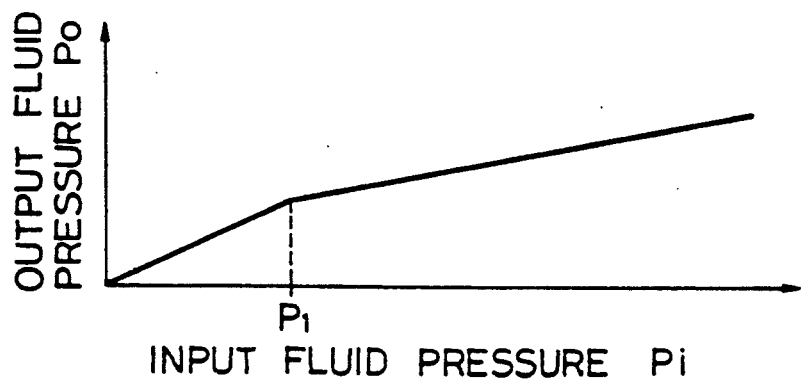
FIG. 14 is a view illustrating the operation of the proportioning control valve.

If the output fluid pressure Po is raised so that "Po·So" increases, "Po·So">"Pi·Si+F" is obtained when a set pressure P1 is attained by the input fluid pressure Pi. Accordingly, the valve plug 35 moves against the urging force of the spring 40 toward cylinder chamber 34, so that the gap A is closed by the peripheral edge portion of the plug 35, as shown in FIG. 13, whereby the output fluid pressure Po is maintained. When the brake pedal 11 is further depressed to increase the input fluid pressure Pi so that "Po·So"<"Pi·Si+F" is obtained again, the gap A is opened again, as shown in FIG. 13, and the output fluid pressure Po increases corresponding to the increase of the pressure Pi. When the gap A is closed again as the output fluid pressure Po increases, the pressure Po is maintained. In the region where the input fluid pressure Pi exceeds the set pressure P1, the gap A is repeatedly opened and closed in the above manner, so that the output fluid pressure Po gently increases. Thus, in this region, the output fluid pressure Po changes in a manner such that its inclination with respect to the input fluid pressure Pi becomes smaller, as shown in FIG. 14. The magnitude of the set pressure P1 and the inclination of the output fluid pressure Po with respect to the input fluid pressure Pi, in the region where the input pressure Pi is higher than the set pressure P1, are unconditionally determined according to the mechanical constants of the PCV, such as the urging force F of the spring 40, pressure receiving areas Si and So, etc.

Figure 11:
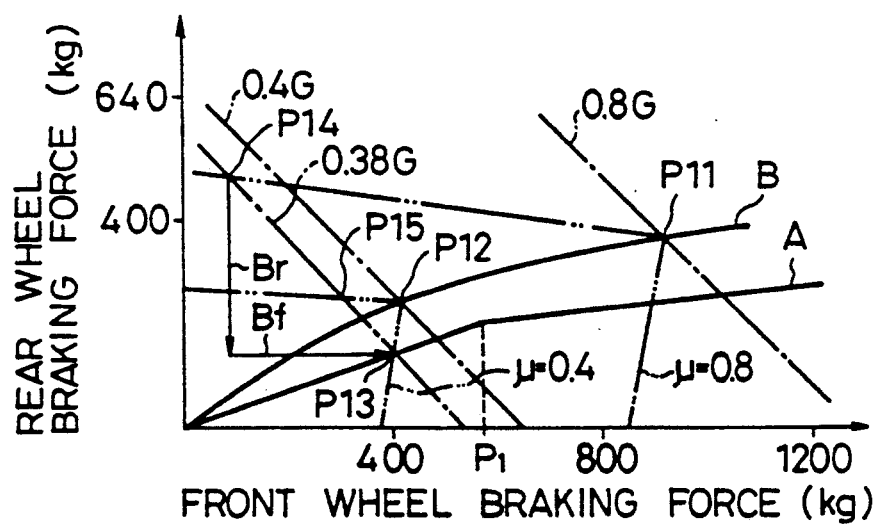
FIG. 11 is a diagram illustrating the fluid pressure distribution of the conventional braking system.

Referring now to FIG. 11, the relationship between a set braking force distribution, set for the vehicle in accordance with the mechanical requirements of the PCVs $17_1$ and $17_2$, and an ideal braking force distribution will be described. In FIG. 11, line A is a set braking force distribution line which, having a bend point, represents the set braking force distribution, and line B is an ideal braking force distribution curve representing the ideal braking force distribution which depends on the specifications of the vehicle. The ideal braking force distribution means a braking force distribution to the front and rear wheels such that the four wheels are simultaneously locked by braking.

An intersecting point P11 between the ideal braking force distribution curve B and a dashed line indicative of the deceleration of 0.8 G represents the braking force distribution which causes the front and rear wheels to be simultaneously locked by hard braking with the deceleration of 0.8 G. Likewise, an intersecting point P12 between the ideal braking force distribution curve B and a dashed line indicative of the deceleration of 0.4 G represents the braking force distribution which causes the front and rear wheels to be simultaneously locked by braking with the deceleration of 0.4 G. At every point on the dashed straight line for the deceleration of 0.8 G or 0.4 G, the same combined braking force (sum of braking forces for front and rear wheels) is required for the braking with the deceleration of 0.8 G or 0.4 G. A deceleration produced by ordinary braking ranges from 0.2 G to 0.3 G. The two-dot chain line represents the braking force to lock the front or rear wheels when the coefficient of friction of a road surface is 0.8 or 0.4. The friction coefficient $\mu$ of a dry surface of an asphalt road is about 0.8 in fine weather. The point P11 indicates the ideal braking force distribution for the front and rear wheels which are simultaneously locked on a road surface with the friction coefficient $\mu$ of 0.8 by hard braking with the deceleration of 0.8 G. Likewise, the point P12 indicates the ideal braking force distribution for the front and rear wheels which are simultaneously locked on a road surface with the friction coefficient $\mu$ of 0.4 by braking with the deceleration of 0.4 G.

As mentioned before, there is the ideal braking force distribution curve B which indicates that the front and rear wheels are simultaneously locked. Actually, however, the braking force for the rear wheels is adjusted to a smaller value than that of the ideal braking force. This is because the braking stability is lowered if the rear wheels are locked earlier than the front wheels. Thus, the set braking force is adjusted so that the straight line A for the rear wheel braking force never clears the ideal braking force distribution curve B.

If braking with the deceleration of 0.38 G is effected on a road surface with the friction coefficient $\mu$ of 0.4, a braking force distribution is made such that the combined braking force is represented by an intersecting point P13 between a straight line for 0.38 G and the set braking force distribution line A. Even though the rear wheel braking force is increased to the level of the braking force distribution at an intersecting point P15, however, the rear wheels are never locked. If braking with the deceleration of 0.38 G is effected on a road surface with the friction coefficient $\mu$ of 0.8, moreover, the rear wheels are never locked even though the rear wheel braking force is increased to the level of the braking force distribution at an intersecting point P14 between the straight line for 0.38 G and a straight line for the friction coefficient $\mu$ of 0.8. Thus, even when the braking is effected with the same deceleration, the front wheel braking force can be reduced by Bf, and the rear wheel braking force can be increased by Br beyond the level of the ideal braking force distribution, depending on the state of the road surface. In other words, although there is enough room for the increase of the rear wheel braking force, depending on the vehicle running conditions and road surface conditions, as long as the set braking force distribution line A is used, the combined braking force is produced by correspondingly increasing the front wheel braking force.

As described before under the caption "BACKGROUND OF THE INVENTION," the conventional braking systems have some problems, such as increased load on the front wheel braking unit. According to the alternative conventional examples which are arranged so that the rear wheel braking force distribution can be increased without causing the rear wheels to be locked, moreover, the functions of the proportioning control valves cannot be effectively utilized, as mentioned before.

The following is a description of a braking system furnished with a rear wheel braking force control apparatus according to a first embodiment of the present invention.

Figure 1:
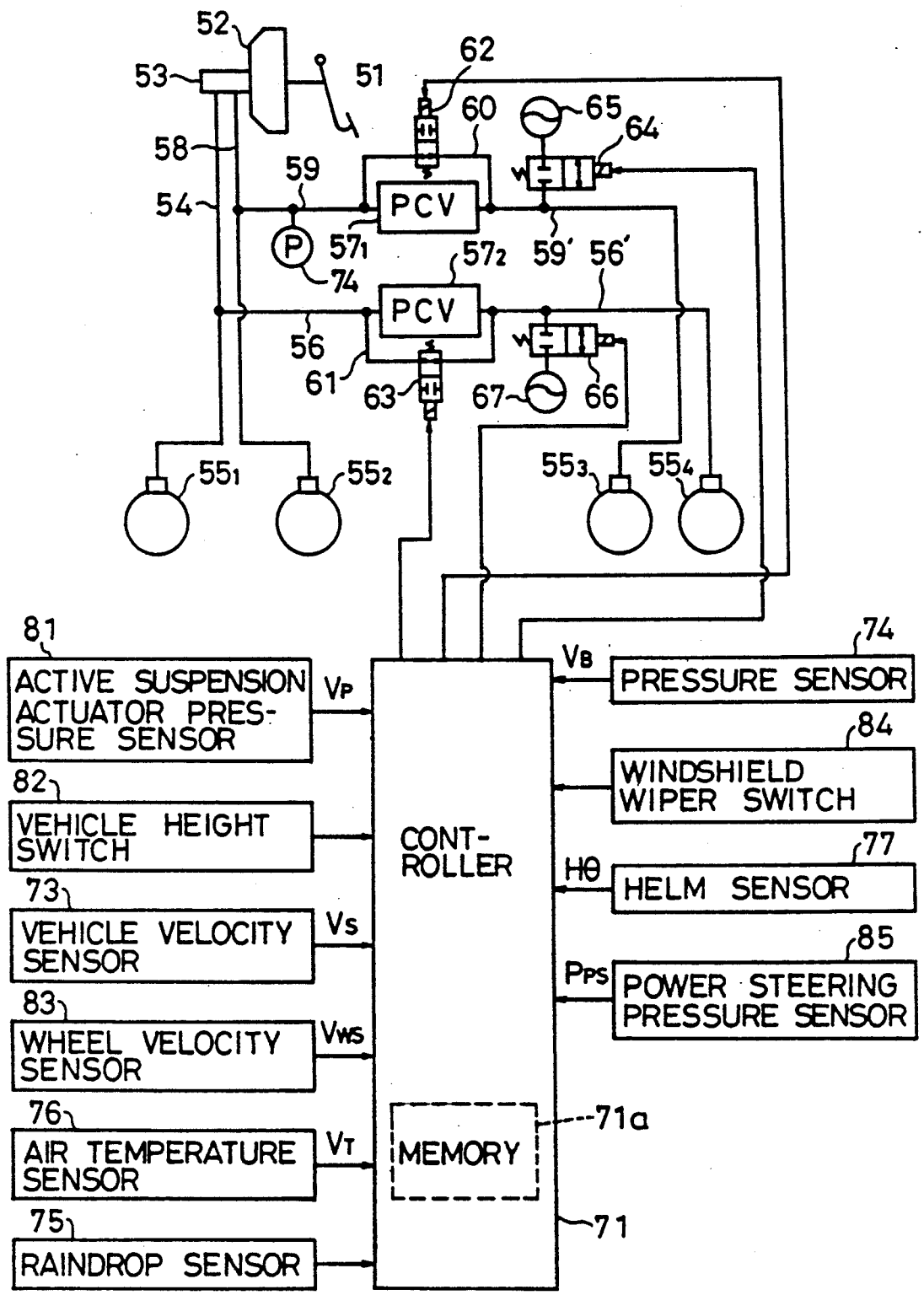
FIG. 1 is a block diagram showing a rear wheel braking force control apparatus according to a first embodiment of the present invention.

As shown in FIG. 1, the braking system comprises a brake pedal 51, an intensifier 52, and a master cylinder 53 which correspond to the elements 11, 12 and 13, respectively, shown in FIG. 10, wheel cylinders $55_1$, $55_2$, $55_3$ and $55_4$, which correspond to the elements $15_1$, $15_2$, $15_3$ and $15_4$, respectively, ducts 54, 56, 58 and 59, which correspond to the elements 14, 16, 18 and 19, respectively, and PCVs $57_1$ and $57_2$, which correspond to the elements $17_1$ and $17_2$, respectively. The ducts constitute a first passage which connects the master cylinder 53 and the wheel cylinders $55_3$ and $55_4$ for rear left and right wheels.

In this braking system, a treading force on the brake pedal 51 is amplified by means of the intensifier 52, and then transmitted to the master cylinder 53 of a tandem. The master cylinder 53 includes two fluid pressure generator sections (not shown) for generating a brake fluid pressure corresponding to the depth of depression of the brake pedal 51. One of the fluid pressure generator sections is connected to the wheel cylinder $55_1$ for a front left wheel by means of the duct 54, and is also connected to the wheel cylinder $55_4$ for the rear right wheel by means of the duct 56, which diverges from the middle of the duct 54, and the PCV $57_2$. The other fluid pressure generator section is connected to the wheel cylinder $55_2$ for a front right wheel by means of the duct 58, and is also connected to the wheel cylinder $55_3$ for the rear left wheel by means of the duct 59, which diverges from the middle of the duct 18, and the 57₁.

The PCVs 57₁ and 57₂ are proportioning control valves which serve to directly transmit the master cylinder pressure when the braking force is relatively small, and to lower the rate of increase of the rear wheel cylinder pressure compared with that of the master cylinder pressure when the master cylinder pressure exceeds a set pressure. Since these valves are constructed in the same manner as the one described with reference to FIGS. 12 to 14, a detailed description of the valves is omitted.

A by-pass pipe 60 extends between the upper- and lower-course sides of the duct 59 with respect to the PCV 57₁. Likewise, a by-pass pipe 61 extends between the upper- and lower-course sides of the duct 56 with respect to the PCV 57₂. The by-pass pipes 60 and 61 are provided with PCV by-pass valves 62 and 63, respectively, and the valves 62 and 63 constituted by normally-open solenoid-operated valves serve selectively to make the pressure control effect of the PCVs 57₁ and 57₂ effective or ineffective. More specifically, when the PCV by-pass valve 62 or 63 is left open, a fluid pressure from the master cylinder 53 by-passes the PCV 57₁ or 57₂ as it is supplied to the wheel cylinder 55₃ or 55₄, so that the PCV is not activated. When the valve 62 or 63 is closed, the PCV 57₁ or 57₂ is activated.

Figure 3:
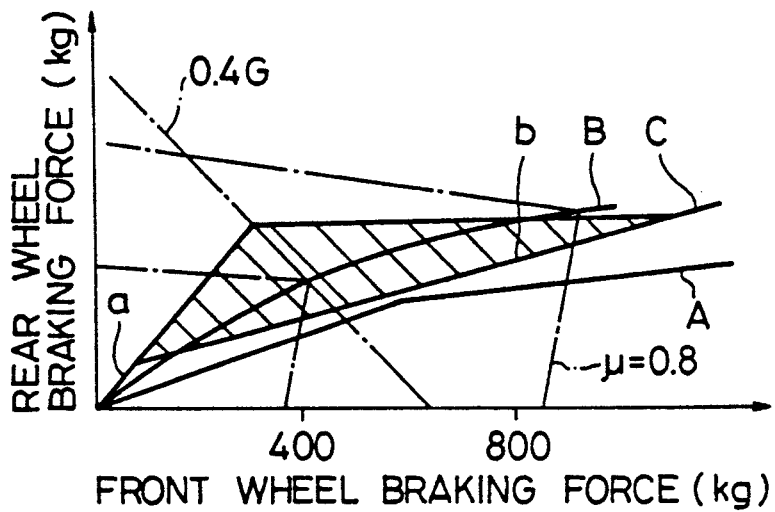
FIG. 3 is a diagram illustrating the braking force distribution of front and rear wheels.

In the present embodiment, the set pressure under which the PCV by-pass valves 62 and 63 are to be closed are varied to change the master cylinder pressure for the start of the operation of the PCVs 57₁ and 57₂, so that the braking force distribution for the rear wheels can be controlled. More specifically, the apparatus of the present embodiment can control the rear wheel braking force distribution within the hatched region of FIG. 3. Thus, the rear wheels can be subjected to a higher braking force than in the case of the braking force distribution along the ideal braking force distribution curve B. In FIG. 3, a bent line C formed of straight lines a and b represents a braking force distribution obtained when the PCV by-pass valves 62 and 63 are kept closed. The leading edge portion of the line C, represented by the straight lines a, is steeper than that of the bent line A (FIG. 11) which represents the braking force distribution characteristic of the conventional apparatus. This is so because the ratio of the pressure receiving areas of the wheel cylinders 55₃ and 55₄ for the rear wheels to those of the wheel cylinders 55₁ and 55₂ for the front wheels is as high as about 50 to 50, which is higher than in the conventional case. The bend point and the braking force distribution characteristic observed after the bend point is passed are attributable to the structural arrangement of the PCVs 57₁ and 57₂.

Figure 4:
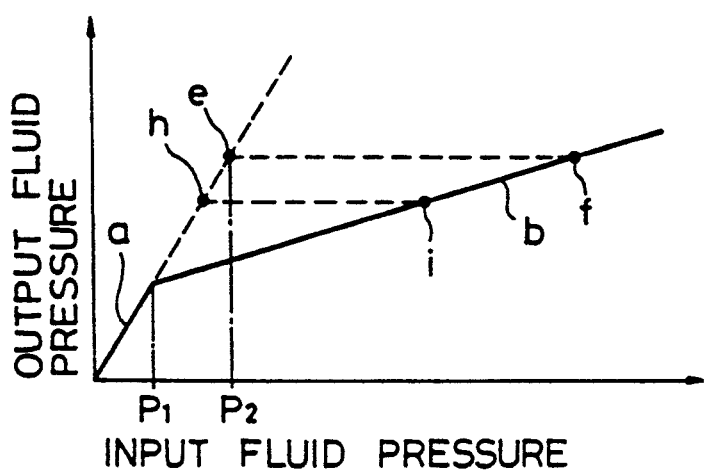
FIG. 4 is a diagram for illustrating the operation of a proportioning control valve.

As shown in FIG. 4, the bent line C of FIG. 3 also represents the input-output characteristics of the PCVs 57₁ and 57₂. When the PCV by-pass valves 62 and 63 are closed, the output fluid pressure of each of these valves is determined by the straight line a before the input fluid pressure of each of the PCVs 57₁ and 57₂ attains P1, and by the straight line b when the input fluid pressure exceeds P1. If the input fluid pressure is increased with the valves 62 and 63 open, the output fluid pressure increases in the manner indicated by an extension (broken line) of the straight line a even when P1 is exceeded by the input fluid pressure. Thus, if the PCV by-pass valves 62 and 63 are closed when P2, which is higher than P1, is attained by the input fluid pressure, for example, the output fluid pressure increases along the extension of the straight line a until the input fluid pressure, after exceeding P1, attains P2. When the input fluid pressure exceeds P2, the output fluid pressure is kept at a point f corresponding to a broken line ef which passes through a point e on the extension corresponding to P2 and crosses the straight line b. When the input fluid pressure exceeds a value corresponding to the intersecting point f between the broken line ef and the straight line b, moreover, the output fluid pressure increases along the straight line b. The output fluid pressure is thus kept in the input fluid pressure region corresponding to the broken line ef for the following reason. If the output fluid pressure Po is higher than a value for a normal control state indicated by the straight line b, "Po·So">"Pi·Si+F" is obtained, so that the gap A is closed, as shown in FIG. 13.

Referring again to FIG. 1, the duct 59, as the first passage, includes a duct 59' as a second passage which connects the lower-course side of the PCV 57₁ and the wheel cylinder 55₃ for the rear left wheel. An accumulator 65, for use as a reservoir, is connected to the duct 59' through a normally-closed solenoid-operated on-off valve 64, which serves as a reducing valve. Likewise, the duct 56, as the first passage, includes a duct 56' as the second passage which connects the lower-course side of the PCV 57₂ and the wheel cylinder 55₄ for the rear right wheel. An accumulator 67 is connected to the duct 56' through a normally-closed solenoid-operated on-off valve 66.

The rear wheel braking force control apparatus further comprises a controller 71, formed of a microcomputer and its peripheral circuit, and various sensors connected to the controller 71. The controller 71 serves as control means for controlling the on-off operation of the PCV by-pass valves 62 and 63 and the solenoid-operated valves 64 and 66. The sensors connected to the controller 71 include a vehicle velocity sensor 73 for detecting a vehicle velocity $V_S$, a pressure sensor 74 (the present embodiment employs a single pressure sensor attached to one of lines of a two-way duct, but two pressure sensors may be attached to both of the lines) for detecting a braking pressure $V_B$ or fluid pressure delivered from the master cylinder 53, and a raindrop sensor 75 for detecting rainfalls. The sensor 75 is adapted to deliver an off-signal in fine weather, and an on-signal in rainy weather. The connected sensors further include an air temperature sensor 76 for detecting an air temperature T and a helm sensor 77 for detecting a helm $H\theta$ of a steering wheel. Detection signals from the sensors 73 to 77 are supplied to the controller 71. The vehicle velocity sensor 73 detects the vehicle velocity $V_S$ by detecting the rotational frequency of the drive system of the vehicle, and the vehicle velocity $V_S$ practically corresponds to the rotational frequency of the driving wheels.

Numeral 81 denotes an active suspension actuator pressure sensor for detecting a pressure $V_P$ of a rear wheel actuator of an active suspension. The active suspension is a suspension in which a fluid is fed into and discharged from fluid spring chambers, which are provided individually for suspension units of the vehicle, so that the load bearing capacity of each suspension unit can be varied to effect absorption of vibration, attitude control such as roll control for turning, vehicle height adjustment, etc. The pressure sensor 81 detects the pressure in each fluid spring chamber, and supplies the detected pressure $V_P$ to the controller 71. Numeral 82 denotes a vehicle height switch for assigning the vehicle height level of the vehicle which carries the active suspension. The switch 82 can select a standard vehicle height, an L vehicle height lower than the standard vehicle height, and an H vehicle height higher than the standard vehicle height. Numerals 83, 84 and 85 denote a wheel velocity sensor for detecting a wheel velocity $V_{WS}$ of the driven wheels (rear wheels), a windshield wiper switch for actuating the windshield wipers, and a power steering pressure sensor for detecting a power steering pressure $P_{PS}$, respectively. The wheel velocity $V_{WS}$ detected by means of the sensor 83, an on-off signal from the switch 84, and the power steering pressure $P_{PS}$ detected by means of the sensor 85 are supplied to the controller 71. These sensors and switches 73 to 85 constitute braking condition detecting means.

Figure 2:
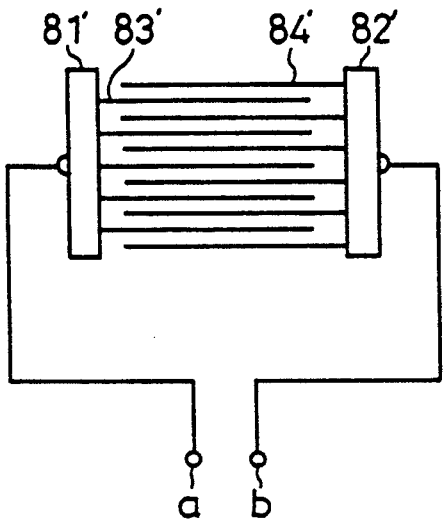
FIG. 2 is a schematic view of a raindrop sensor.

Referring now to FIG. 2, the raindrop sensor 75 will be described in detail.

In FIG. 2, numerals 81' and 82' denote electrodes which face each other. Comb-shaped conductors 83' extend from the one electrode 81' toward the other electrode 82', while comb-shaped conductors 84' extend from the electrode 82' toward the electrode 81'. Each conductor 83' is located between its corresponding pair of conductors 84'. The raindrop sensor 75, which is used with voltage applied between the electrodes 81' and 82', detects a rainfall when it is subjected to a current flow which is attributable to a short circuit caused between terminals a and b by raindrops.

Figure 5:
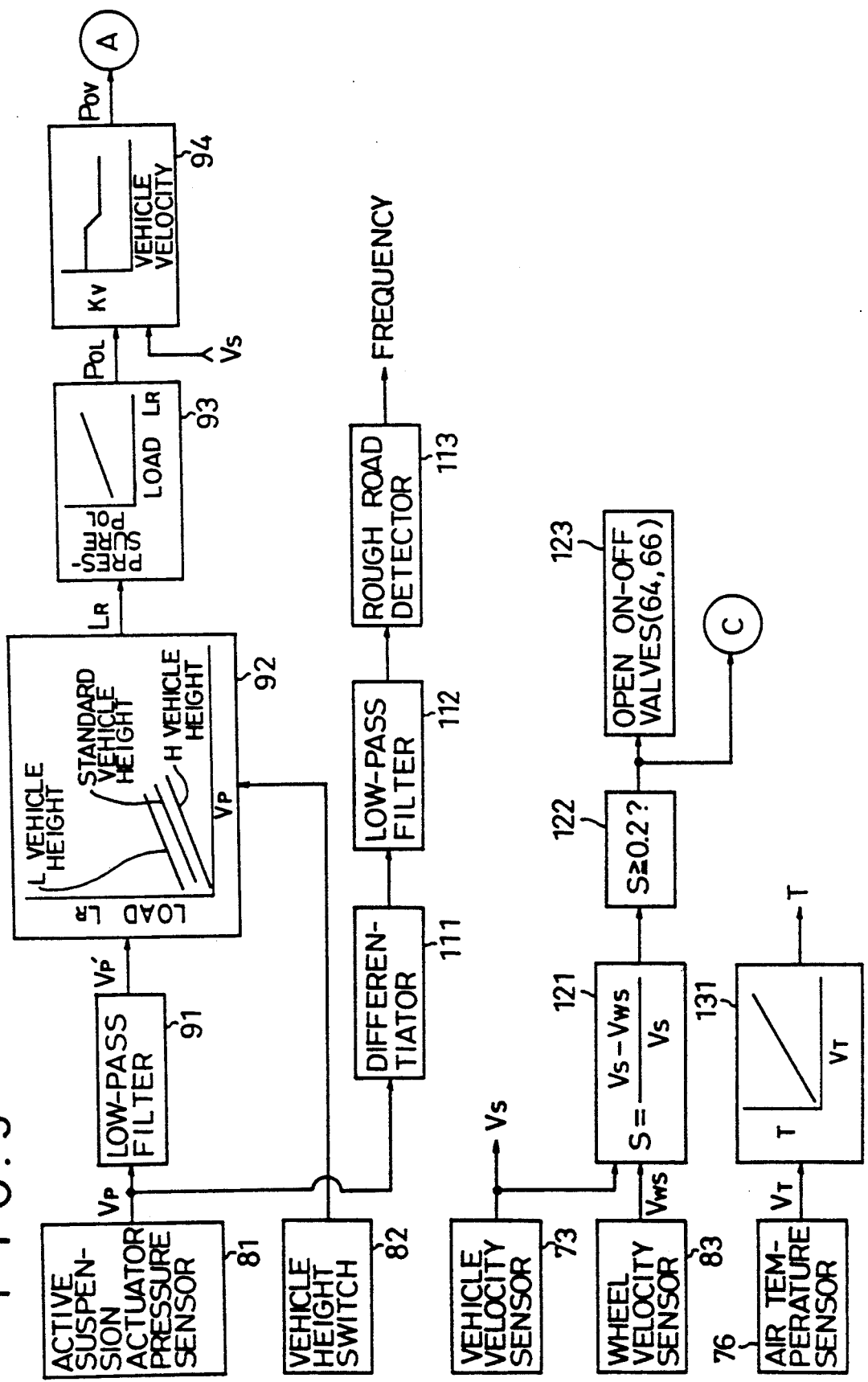
FIG. 5 is a function block diagram showing a part of the contents of control of the control apparatus.
Figure 6:
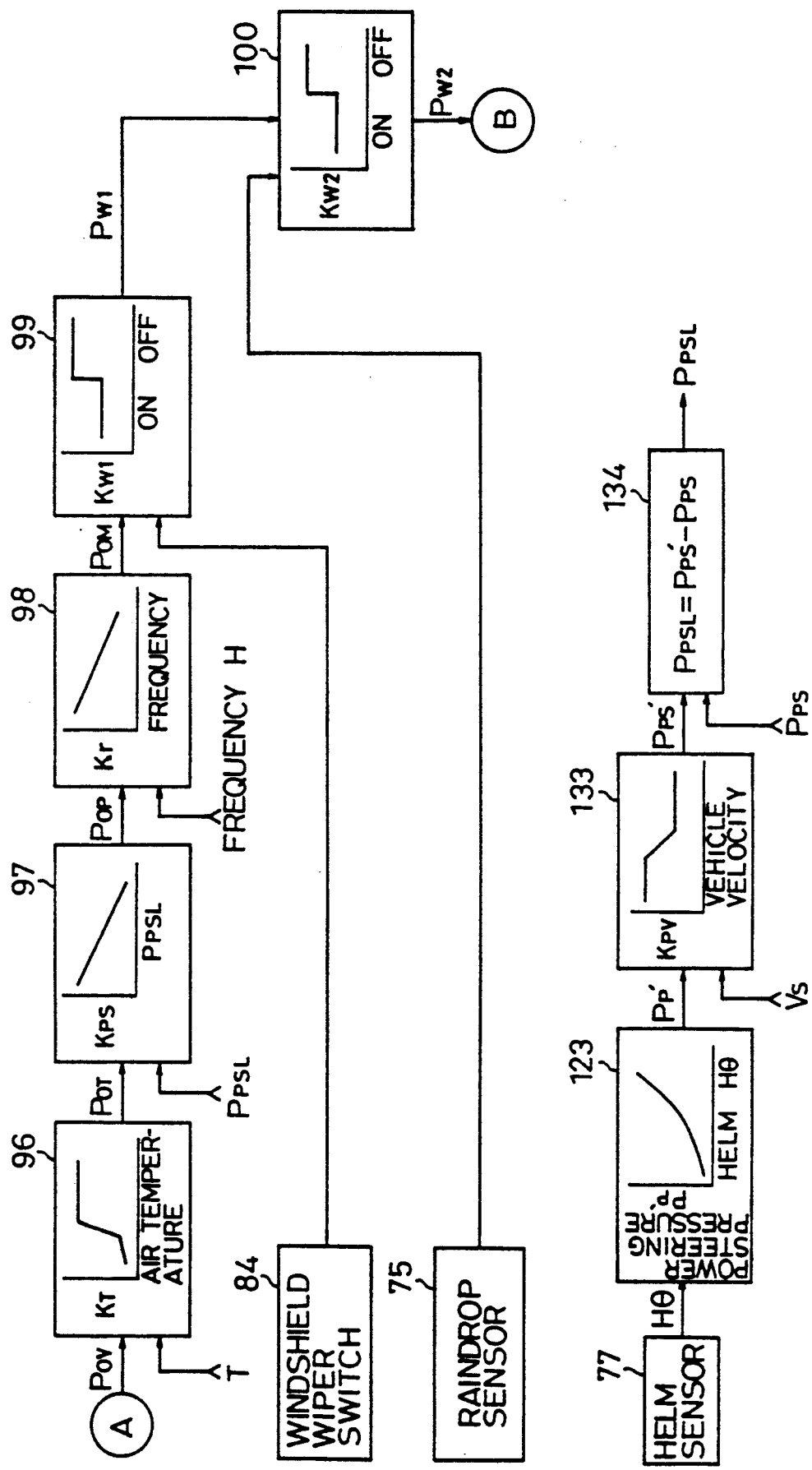
FIG. 6 is a function block diagram showing another part of the control contents partially shown in FIG. 5.
Figure 7:
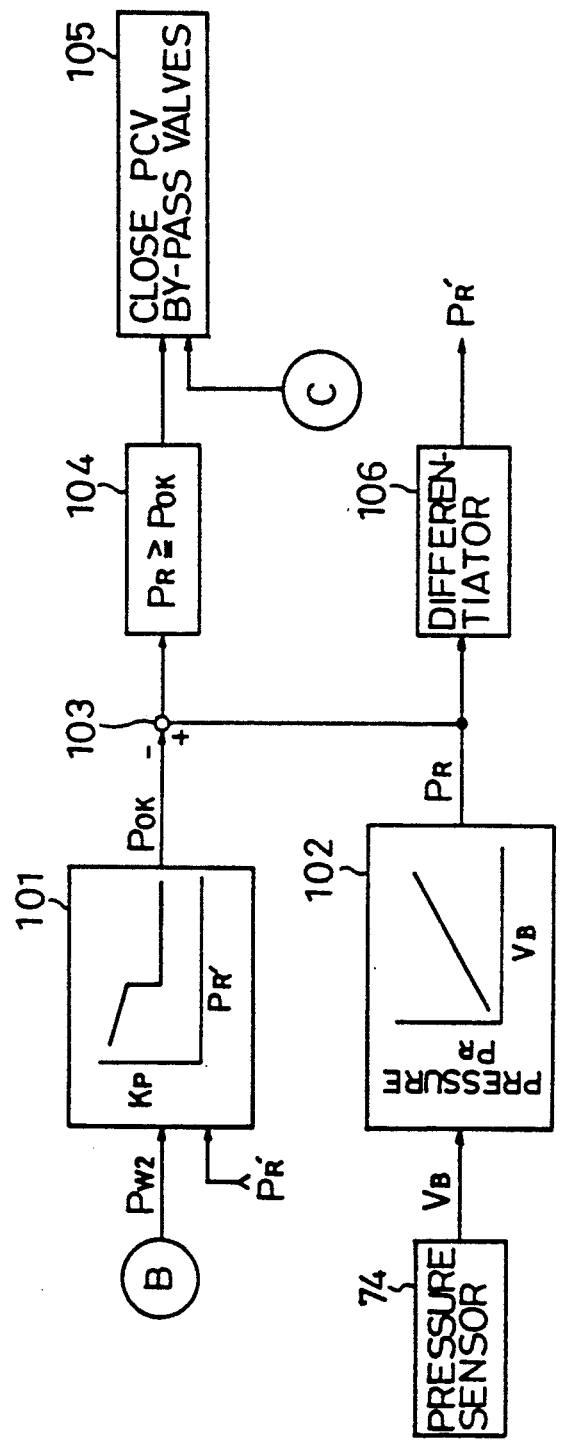
FIG. 7 is a function block diagram showing still another part of the control contents partially shown in FIGS. 5 and 6.

Referring now to FIGS. 5 to 7, the contents of control by means of the controller 71 will be described.

In FIGS. 5 to 7, the pressure $V_P$ detected by means of the pressure sensor 81 is applied to a low-pass filter 91, and a pressure $V_P'$ from the filter 91, whose high-frequency variation is cut, along with a control signal from the vehicle height switch 82, is applied to a rear wheel load estimator section 92. The estimator section 92 estimates a rear wheel load $L_R$ which corresponds to the pressure $V_P'$ or $V_P$, depending on the vehicle height, H, standard, or L, assigned by the control signal from the vehicle height switch 82. A map illustrated in a block 92 of FIG. 5 and various other maps mentioned later are stored in memory means 71a of the controller 71. The pressure-load ($V_P - L_R$) map is arranged set so that the load $L_R$ for the L vehicle height is greater than that for the standard or H vehicle height at the same pressure $V_P$. This is attributable to the fact that if the H vehicle height is selected, the pressure of the pressure sensor 81 increases to supply the fluid to the fluid spring chambers, in order to increase the vehicle height. Thus, even though the load $L_R$ is fixed, the output of the pressure sensor 81 is higher if the H vehicle height is selected.

The rear wheel load $L_R$ obtained by means of the rear wheel load estimator section 92 is delivered to a closing pressure setter section 93 for setting a closing pressure $P_{OL}$ which is used to close the PCV by-pass valves 62 and 63. The closing pressure $P_{OL}$ is set so that the greater the load, the higher it is. This is because the rear wheels are less liable to lock if the load becomes greater, as mentioned before.

The closing pressure $P_{OL}$ set by means of the closing pressure setter section 93, along with the vehicle velocity $V_S$ from the vehicle velocity sensor 73, is delivered to a vehicle velocity compensator section 94. In the compensator section 94, the closing pressure $P_{OL}$ from the closing pressure setter section 93 is multiplied by a coefficient $K_V$, and the resulting value or corrected closing pressure $P_{OV}$ is delivered to a slip factor compensator section 95. The coefficient $K_V$ is set so that the higher the vehicle velocity, the smaller it is. This is intended to leave a margin for stability, in consideration of the fact that the higher the vehicle velocity, the greater the influence of lowered stability, attributable to an excessively large rear wheel braking force, is.

The corrected closing pressure $P_{OV}$, outputted from the vehicle velocity compensator section 94, is delivered to an air temperature compensator section 96 shown in FIG. 6. In the compensator section 96, the pressure $P_{OV}$ is multiplied by a coefficient $K_T$ which varies depending on the air temperature T detected by means of the air temperature sensor 76. As seen from the map of block 96, the coefficient $K_T$ is set to a small value in the region where the air temperature T is low, and to a large value in the higher-temperature region. This is done because the lower the air temperature T, the less slippery the road surface is, and the more easily the rear wheels can be locked.

A corrected closing pressure $P_{OT}$ outputted from the air temperature compensator section 96 is delivered to a low-$\mu$ road compensator section 97, whereupon it is multiplied by a coefficient $K_{PS}$. The compensator section 97 is supplied with a deviation $P_{PSL}$ between the actual power steering pressure $P_{PS}$ and an estimated power steering pressure $P_{PS}'$, which will be mentioned later. As seen from the map of the block 97, the coefficient $K_{PS}$ is set so that the greater the deviation $P_{PSL}$, the smaller it is. This is because the actual power steering pressure $P_{PS}$ is lower than the estimated power steering pressure $P_{PS}'$ on a low-$\mu$ road.

Further, a corrected closing pressure $P_{OP}$ from the low-$\mu$ road compensator section 97 is delivered to a rough road compensator section 98, and is multiplied by a coefficient $K_r$. The compensator section 98 is supplied with a level frequency H from a rough road detector section, which is indicative of the roughness of the road, and will be mentioned later. As seen from the map of the block 98, the higher the level frequency H, the rougher the road is concluded to be. On a rough road, the rear wheels are liable to be locked, so that the coefficient $K_r$ is lowered.

A corrected closing pressure $P_{OM}$ from the rough road compensator section 98 is delivered to a first wet road compensator section 99, and is multiplied by a coefficient $K_{W1}$. The compensator section 99 is supplied with the operation (on-off) signal from the windshield wiper switch 84. As seen from the map of the block 99, the coefficient $K_{W1}$ is set so as to be changed to a smaller value when the switch 84 is turned on. This is because the rear wheels are liable to be locked on a rain-wet road such that the switch 84 is turned on.

A corrected closing pressure $P_{W1}$ from the first wet road compensator section 99 is delivered to a second wet road compensator section 100, and is multiplied by a coefficient $K_{W2}$. The compensator section 100 is supplied with the output signal from the raindrop sensor 75. As seen from the map of the block 100, the coefficient $K_{W2}$ is set so as to be changed to a smaller value when the output of the sensor 75 is turned on to indicate a rainfall. This is because the rear wheels are liable to be locked on a rain-wet road such that the sensor 75 is turned on.

A closing pressure $P_{W2}$ outputted from the second wet road compensator section 100 is delivered to a hard braking compensator section 101 shown in FIG. 7, and is multiplied by a coefficient $K_P$ to calculate a closing pressure $P_{OK}$. The compensator section 101 is supplied with a time-dependent changing rate $P_R'$ of the braking pressure, which is indicative of hard braking. As seen from the map of the block 101, the coefficient $K_P$ is set so as to become smaller as the changing rate $P_R'$ of the braking pressure increases, and to be fixed to a low value when the rate $P_R'$ exceeds a certain level, whereby the closing pressure is corrected for reduction when the vehicle is braked hard.

An electrical signal $V_B$, which corresponds to the brake fluid pressure detected by means of the pressure sensor 74, is delivered to a converter section 102, whereupon it is converted into a brake fluid pressure $P_R$. In a subtracter section 103, the closing pressure $P_{OK}$ is subtracted from the brake fluid pressure $P_R$. A value indicative of the result of this subtraction is delivered to a discriminator section 104, whereupon it is determined whether there is a relation $P_R \geq P_{OK}$ or not. If the decision is positive, a processor section 105 is activated to close the PCV by-pass valves 62 and 63.

The brake fluid pressure $P_R$ from the converter section 102 is delivered to a differentiator section 106, whereupon the time-dependent changing rate $P_R'$ is obtained and delivered to the hard braking compensator section 101.

As shown in FIG. 5, on the other hand, the pressure $V_P$ of the actuator of the active suspension, detected by means of the pressure sensor 81, is applied to a differentiator section 111 to be differentiated thereby. The output of the differentiator section 111 is delivered to a low-pass filter 112, whereupon its high-frequency component is cut. The output of the filter 112 is delivered to a rough road detector section 113, whereupon the number of times a predetermined level is exceeded within a predetermined period of time is calculated as the frequency H which corresponds to the roughness of the road. The frequency H is delivered to the rough road compensator section 98.

The vehicle velocity $V_S$ corresponding to the velocity of the driving wheels, detected by means of the vehicle velocity sensor 73, and the wheel velocity $V_{WS}$ of the driven wheels, detected by means of the wheel velocity sensor 83, are supplied to a slip factor calculator section 121, whereupon a slip factor S ($=(V_S-V_{WS})/V_S$) is calculated. The calculated slip factor S is delivered to a discriminator section 122, whereupon it is determined whether or not the slip factor S is 0.2 or more. If the decision is positive, it is concluded that the rear wheels are liable to be locked, and processor sections 105 and 123 are activated. Thereupon, the processor section 103 closes the PCV by-pass valves 62 and 63, while the processor section 123 opens the solenoid-operated valves 64 and 66.

A voltage $V_T$ from the air temperature sensor 76, which is proportional to the air temperature T, is delivered to a converter section 131, whereupon it is converted into the air temperature T, which is delivered to the air temperature compensator section 96.

Referring to FIG. 6, the helm H $\theta$ of the steering wheel, detected by means of the helm sensor 77, is supplied to a power steering pressure estimator section 132. A map illustrated in the estimator section 132 indicates a power steering pressure PP' which is required to rotate the steering wheel for the helm H $\theta$. The power steering pressure $P_P'$ is delivered to a vehicle velocity compensator section 133, which receives the vehicle velocity $V_S$ detected by means of the vehicle velocity sensor 73, whereupon the pressure $P_P'$ is corrected in accordance with the vehicle velocity $V_S$. In the compensator section 133, the power steering pressure $P_P'$ is multiplied by a coefficient $K_{PV}$ which is set so as to become smaller as the vehicle velocity increases. In a velocity-responsive power steering system, the helm of the steering wheel is controlled so as to become heavier as the vehicle velocity increases. Thus, the power steering pressure lowers in proportion to the increase of the vehicle velocity.

The corrected estimated power steering pressure $P_{PS}'$ from the vehicle velocity compensator section 133 is applied to a deviation calculator section 134, whereupon the difference between the pressure $P_{PS}'$ and the actual power steering pressure $P_{PS}$ detected by means of the power steering pressure sensor 85 is calculated as the deviation $P_{PSL}$. The deviation $P_{PSL}$, which increases as the friction coefficient $\mu$ of the road surface lowers, is applied to the low-$\mu$ road compensator section 97.

The following is a description of the operation of the rear wheel braking force control apparatus according to the present embodiment constructed in this manner.

The pressure $V_P$ of the actuator of the active suspension, detected by means of the pressure sensor 81, is applied to the low-pass filter 91, whereupon its high-frequency variation is cut. Then, the pressure $V_P$ is applied to the rear wheel load estimator section 92, whereupon the load $L_R$ acting on the rear wheels is estimated depending on the vehicle height selected by means of the vehicle height switch 82. The rear wheel load $L_R$ is delivered to the closing pressure setter section 93, whereupon the closing pressure $P_{OL}$ for closing the PCV by-pass valves 62 and 63, which corresponds to the rear wheel load $L_R$, is obtained. Thereafter, the closing pressure $P_{OL}$ is multiplied successively the coefficients $K_V$, $K_T$, $K_{PS}$, $K_R$, $K_{W1}$, $K_{W2}$ and $K_P$ in the vehicle velocity compensator section 94, air temperature compensator section 96, low-$\mu$ road compensator section 97, rough road compensator section 98, first and second wet road compensator sections 99 and 100, and hard braking compensator section 101, respectively. By doing this, the final closing pressure $P_{OK}$ is obtained.

If the discriminator section 104 concludes that the brake fluid pressure $P_R$ detected by means of the pressure sensor 74 is equal to or higher than the closing pressure $P_{OK}$, the PCV by-pass valves 62 and 63 are closed, and processing for activating the PCVs 57$_1$ and 57$_2$ is executed. More specifically, when the PCV by-pass valves 62 and 63 are closed at a point h which corresponds to the input fluid pressure $P_{OK}$, as shown in FIG. 4, the output fluid pressure is kept at the level of the point h even though the input fluid pressure increases thereafter. After the input fluid pressure attains the level of a point i, thereafter, the output fluid pressure increases along the straight line b. The output fluid pressure is kept in this manner because the relationship "Po·So">"Pi·Si+F" is maintained, as shown in FIG. 13, such that the output fluid pressure Po is higher than the value for the normal control state, as indicated by the straight line b.

If the discriminator section 122 concludes that the slip factor is 0.2 or more, the processor sections 105 and 123 are activated, and the PCV by-pass valves 62 and 63 are closed so that the processing for activating the PCVs 57$_1$ and 57$_2$ is executed. Also, the solenoid-operated valves 64 and 66 are opened, so that the ducts on the lower-course side of the PCVs 57$_1$ and 57$_2$ communicate with the accumulators 65 and 67, respectively.

Figure 8:
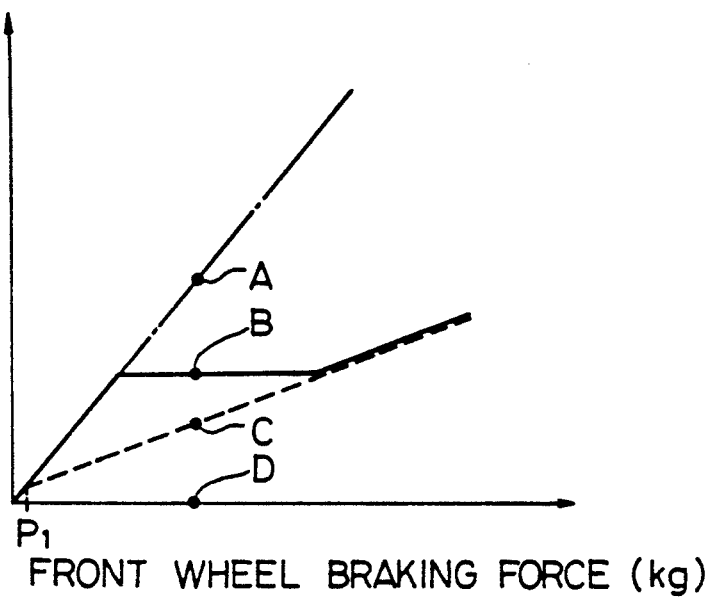
FIG. 8 is a diagram for illustrating the operation of the apparatus of FIG. 1.

When the PCV by-pass valves 62 and 63 are switched from the open state to the closed state, and when the solenoid-operated valves 64 and 66 are opened, the pressure in the wheel cylinders $55_3$ and $55_4$ is absorbed by the accumulators 65 and 67, so that the pressure on the lower-course side of the PCVs $57_1$ and $57_2$ first lowers from a point A of FIG. 8 to the vicinity of a point D, and then increases to a point C by the agency of the PCVs $57_1$ and $57_2$. As the brake pressure increases, thereafter, the fluid pressure increases along the broken line of FIG. 8 by the agency of the PCVs $57_1$ and $57_2$. When the solenoid-operated valves 64 and 66 are opened with the PCV by-pass valves 62 and 63 closed, the pressure on the lower-course side of the PCVs $57_1$ and $57_2$ first lowers from a point B of FIG. 8 to the vicinity of the point D, and then increases to the point C, whereupon it changes along the broken line of FIG. 8. Thus, in the case where the slip factor S is 0.2 or more, the pressure on the lower-course side of the PCVs $57_1$ and $57_2$ is allowed to escape to the accumulators, so that the rear wheels can be prevented from being initially locked.

Figure 15:
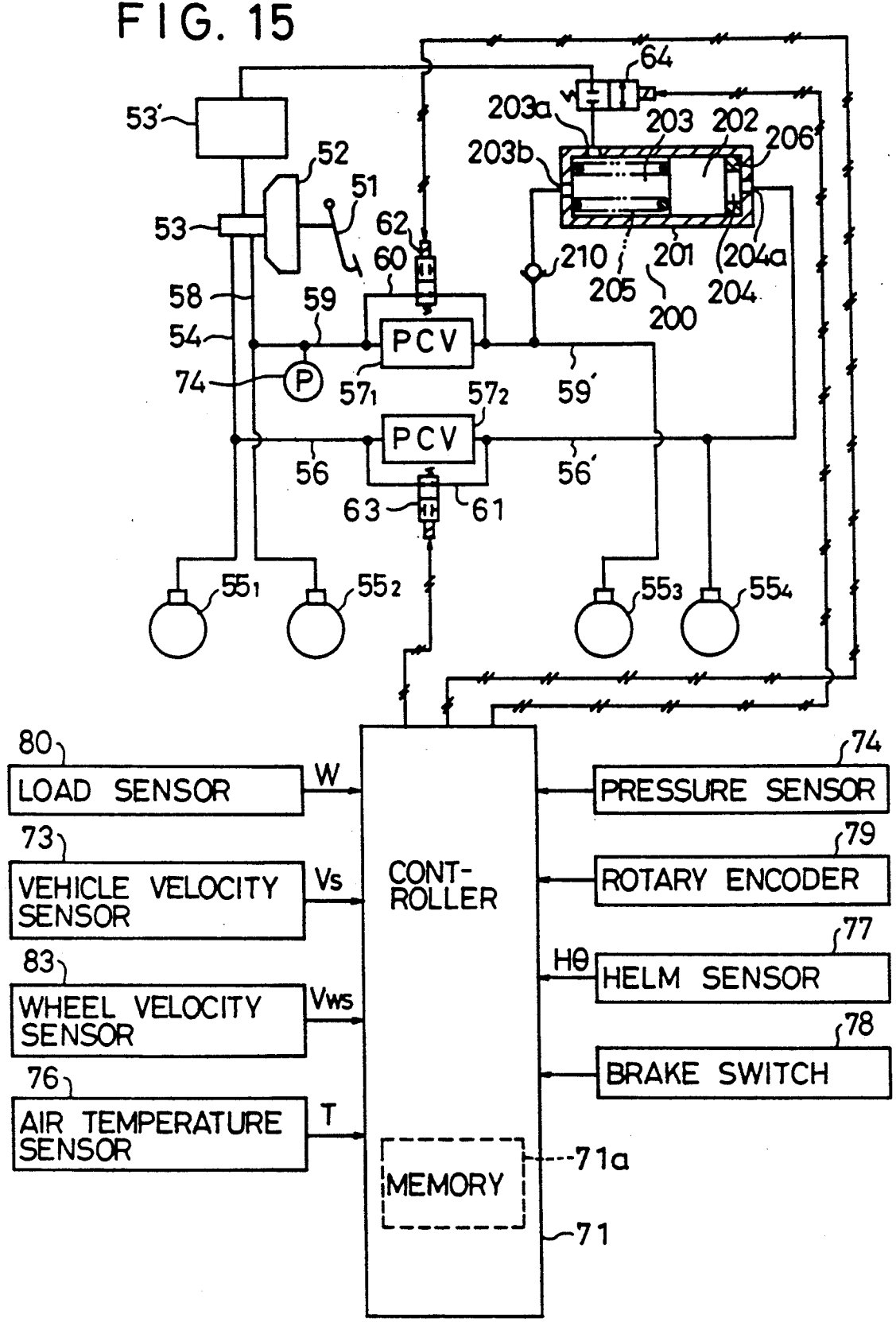
FIG. 15 is a schematic view showing a braking system furnished with a rear wheel braking force control apparatus according to a second embodiment of the invention.

Referring now to FIG. 15, a braking system furnished with a rear wheel braking force control apparatus according to a second embodiment of the present invention will be described.

The apparatus of the present embodiment has the same basic configuration as the apparatus of the first embodiment. The second embodiment, however, differs from the first embodiment mainly in that a common reducing valve 64 for the rear left and right wheel cylinders $55_3$ and $55_4$ and a balance piston mechanism 200 connected to the valves 64 are used in place of the two reducing valves 64 and 66 of the first embodiment.

In the apparatus of the present embodiment, as shown in FIG. 15, the balance piston mechanism 200 includes a cylinder 201 and a piston 202 slidable therein. The cylinder 201 and the piston 202 define first and second cylinder chambers 203 and 204. Arranged in the first cylinder chamber 203 is a spring 205 which continually urges the piston 202 toward the second cylinder chamber 204. Normally, the piston 202 abuts against a stopper 206 which is disposed in the second cylinder chamber 204 and regulates the movement of the piston 202 toward the chamber 204.

The balance piston mechanism 200 is formed with first and second ports 203a and 203b, on the side of the first cylinder chamber 203, and a third port 204a on the side of the second cylinder chamber 204. The first port 203a communicates with a reservoir tank 53', which is used in place of the accumulator 65 of the first embodiment, by means of the reducing valve 64 common to the rear left and right wheel cylinders $55_3$ and $55_4$ when the valve 64 is open. The second port 203b communicates with the duct 59' by means of a check valve 210, which allows only the circulation from the side of the wheel cylinder $55_3$ toward the first cylinder chamber 203. Further, the third port 204a communicates with the duct 56'.

As in the case of the first embodiment, the controller 71 is connected with the vehicle velocity sensor 73, pressure sensor 74, air temperature sensor 76, helm sensor 77, and wheel velocity sensor 83. Further, the controller 71 is connected with a brake switch 78, which operates in association with the depression of the brake pedal 51, a rotary encoder 79 for detecting the rotational speed of a windshield wiper motor (not shown), and load sensors 80 composed of, e.g., piezoelectric devices embedded individually in the seats of the vehicle.

Figures 16, 17:
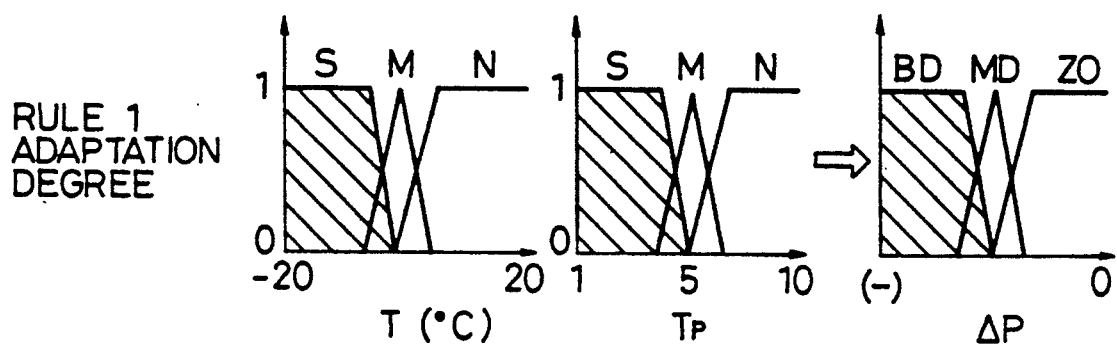
FIG. 16 is a diagram illustrating fuzzy rules stored in a controller shown in FIG. 15.
FIG. 17 is a diagram illustrating membership functions used individually to define fuzzy sets associated individually with the air temperature, windshield wiper operation period, and correction value.

On the basis of a windshield wiper operation period $T_P$ determined by the rotational speed of the windshield wiper motor, which is detected by means of the rotary encoder 79, the controller 71 determines a correction value $\Delta P$ for downwardly correcting the closing pressure $P_{OL}$, according to fuzzy inference, which will be described in detail later. Thus, memory means 71a of the controller 71 is loaded with nine fuzzy rules (FIG. 16) which are described in IF-THEN form. Each fuzzy rule includes the air temperature T and windshield wiper operation period $T_P$ as two items (fuzzy variables) of its antecedent, and the correction value $\Delta P$ as one item of its consequent. In FIG. 16, each of symbols S, M, N, BD, MD and ZO represents a label which is indicative of a fuzzy subset (hereinafter referred to simply as fuzzy set) in a universe of discourse (carrier set) for its corresponding one of the air temperature T, windshield wiper operation period $T_P$, and correction value $\Delta P$. Each fuzzy set is represented by a membership function mentioned later.

In FIG. 16, Rule 1, "If T=S and $T_P$=S, then $\Delta P$=BD," indicates that if the air temperature T and the windshield wiper operation period $T_P$ are low and short, respectively, corresponding to fuzzy sets S, the magnitude of the negative correction value $\Delta P$ is made large. Rules 2 to 9 will now be described in brief.

Rule 2: If the air temperature T and the windshield wiper operation period $T_P$ are low and moderate, respectively, the correction value $\Delta P$ is made large.

Rule 3: If the air temperature T and the windshield wiper operation period $T_P$ are low and long, respectively, the correction value $\Delta P$ is made moderate.

Rule 4: If the air temperature T and the windshield wiper operation period $T_P$ are moderate and short, respectively, the correction value $\Delta P$ is made moderate.

Rule 5: If the air temperature T and the windshield wiper operation period $T_P$ are both moderate, the correction value $\Delta P$ is made moderate.

Rule 6: If the air temperature T and the windshield wiper operation period $T_P$ are moderate and long, respectively, the correction value $\Delta P$ is made small.

Rule 7: If the air temperature T and the windshield wiper operation period $T_P$ are high and short, respectively, the correction value $\Delta P$ is made moderate.

Rule 8: If the air temperature T and the windshield wiper operation period $T_P$ are high and moderate, respectively, the correction value $\Delta P$ is made small.

Rule 9: If the air temperature T and the windshield wiper operation period $T_P$ are high and long, respectively, the correction value $\Delta P$ is made small.

Membership functions for individually defining the three fuzzy sets S, M and N for the air temperature T, membership functions for individually defining the three fuzzy sets S, M and N for the windshield wiper operation period $T_P$, and membership functions for individually defining the three fuzzy sets BD, MD and ZO for the correction value $\Delta P$ are predetermined as shown in FIG. 17, and are stored in the memory means 71a of the controller 71.

Referring to FIG. 17, the membership function associated with the fuzzy set S for the air temperature T is set so that its adaptation degree is 1 when the air temperature T is not higher than a first predetermined temperature, which is lower than 0° C., and that the adaptation degree is reduced from 1 to 0 as the temperature T increases from the first predetermined temperature to 0° C. Further, the membership function associated with the fuzzy set M for the air temperature T is set so that its adaptation degree varies between 0 and 1 as the temperature T changes from the first predetermined temperature to a second predetermined temperature which is higher than 0° C. Also, the membership function associated with the fuzzy set N for the air temperature T is set so that its adaptation degree varies between 0 and 1 when the temperature T is not lower than 0° C.

The membership functions associated with the fuzzy sets S, M and N for the windshield wiper operation period $T_P$ and the fuzzy sets BD, MD and ZO for the correction value $\Delta P$ are set substantially in the same manner as the fuzzy sets S, M and N for the air temperature T, as shown in FIG. 17. For example, the membership function associated with the fuzzy set S for the windshield wiper operation period $T_P$ is set so that its adaptation degree is 1 when the period $T_P$ is not longer than a first predetermined period, which is shorter than 5 cycles per minute, and that the adaptation degree varies between 0 and 1 as the temperature T changes within a range from the first predetermined period to 5 cycles per minute. Further, the membership function associated with each fuzzy set for the correction value $\Delta P$ is set so that its adaptation degree varies between 0 and 1 as the correction value $\Delta P$ changes within a negative region.

Figure 18:
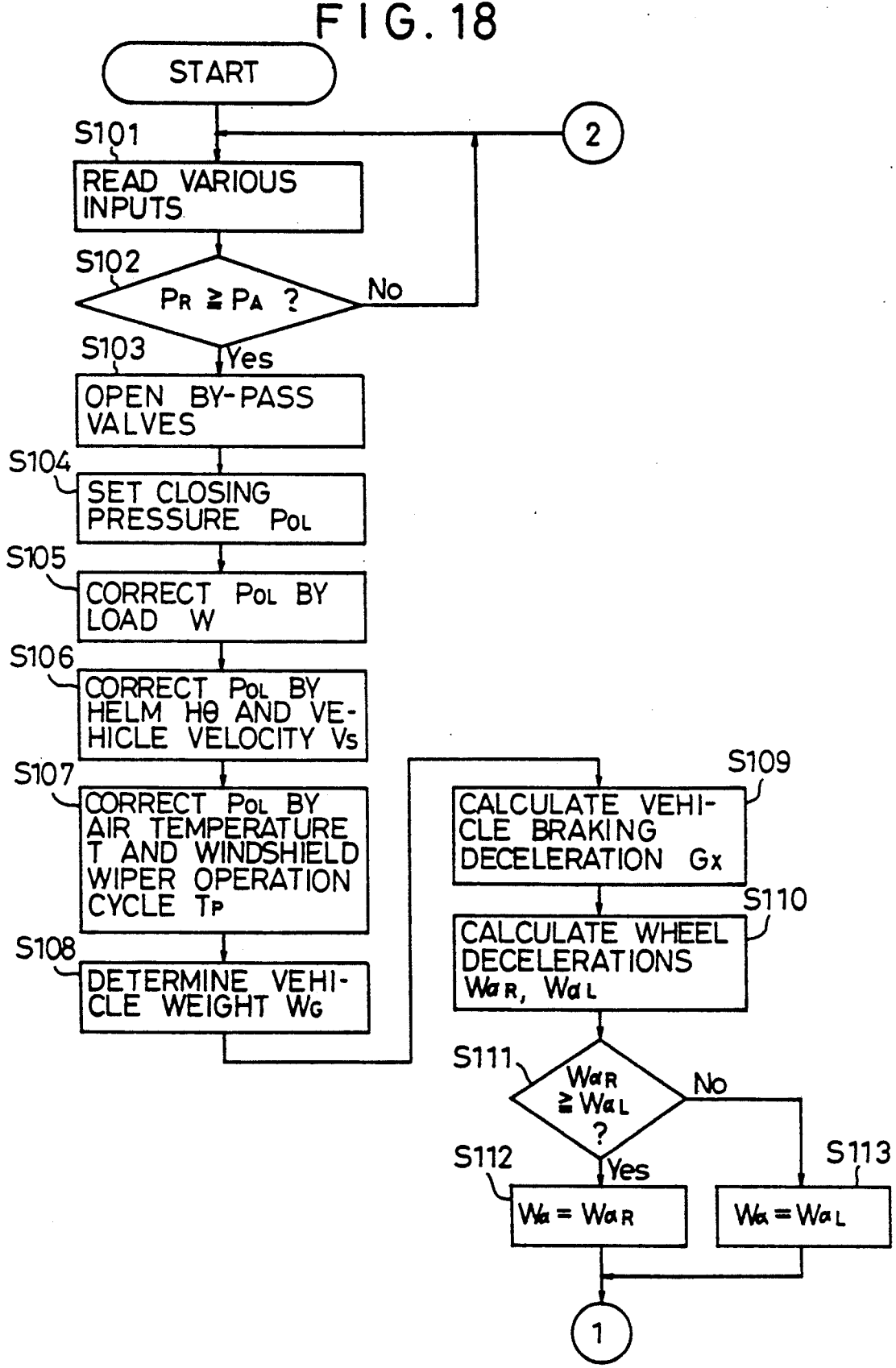
FIG. 18 is a flow chart showing some of control processes executed by the controller of FIG. 15.
Figure 19:
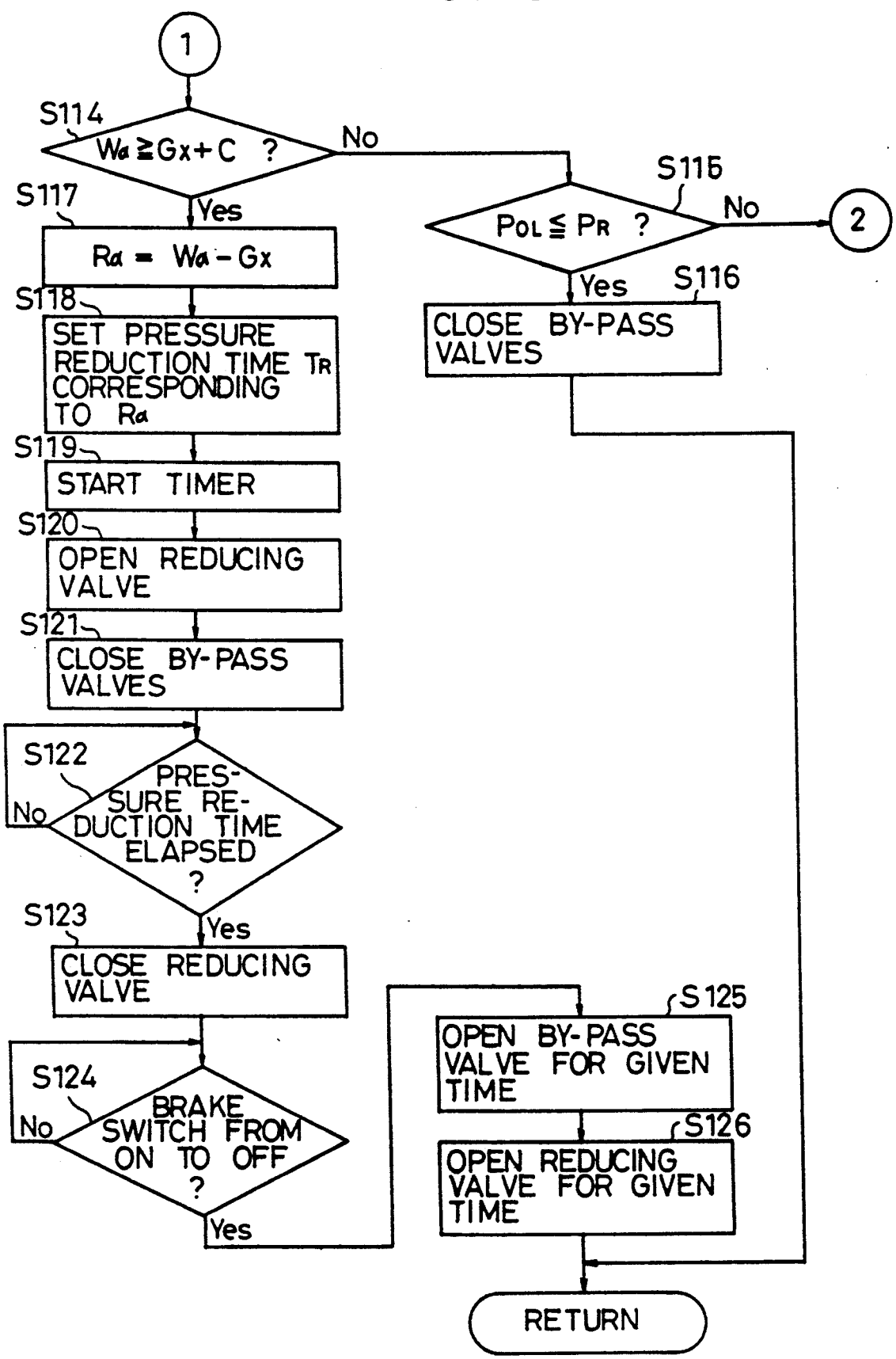
FIG. 19 is a flow chart showing the remaining control processes following the ones shown in FIG. 18.

Referring now to FIGS. 18 and 19, the operation of the apparatus of the second embodiment will be described.

When an ignition key of the vehicle is turned on, the controller 71 reads various input signals delivered from the pressure sensor 74, air temperature sensor 76, helm sensor 77, brake switch 78, rotary encoder 79, load sensor 80, and wheel velocity sensor 83 (Step S101). If it is concluded, in accordance with the output of the brake switch 78, that the brake pedal 51 is not depressed, the controller 71 executes Step S101 again. When braking operation is performed, it is determined whether or not the output of the pressure sensor 74 is not lower than a predetermined value $P_A$, e.g., 2 kg/cm² (Step S102). If the decision in this step is negative, then there is the possibility of the braking system having developed some trouble in operation, so that the controller 71 returns to Step S101.

Figure 20:
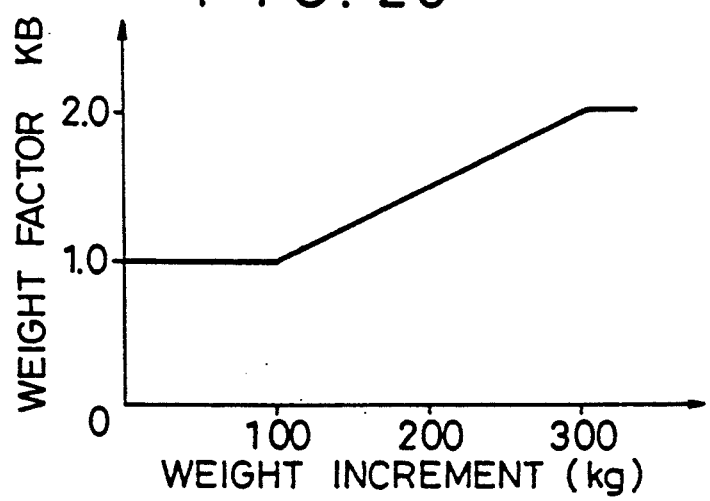
FIG. 20 shows a map for obtaining weight factor $K_B$ used in the control of FIGS. 18 and 19.

If $P_R \geq P_A$ is detected in Step S102, on the other hand, the controller 71 concludes that the braking system is normally operating, and a low-level control output, for example, is delivered to the by-pass valves 62 and 63, which are formed of normally-open solenoid-operated valves, so that the valves 62 and 63 are opened (Step S103). Subsequently, the closing pressure (target value) $P_{OL}$ for closing the by-pass valves 62 and 63 is adjusted to a predetermined initial value (Step S104). Then, the controller 71 corrects the closing pressure $P_{OL}$ in accordance with a load sensor output W (Step S105). To attain this, the controller 71 discriminates the state of persons on the individual seats of the vehicle in accordance with the load sensor output W, and calculates an increment of the load on the rear wheels produced by the weight of the seated persons. Further, the controller 71 calculates a weight factor $K_B$ corresponding to the weight increment with reference to a map shown in FIG. 20, and corrects the closing pressure $P_{OL}$ according to the rear wheel load by multiplying the closing pressure by the factor $K_B$. Since the rear wheels become less easy to be locked as the rear wheel load increases, the weight factor $K_B$ is set so that its value increases in proportion to the increase of the weight increment.

Figure 21:
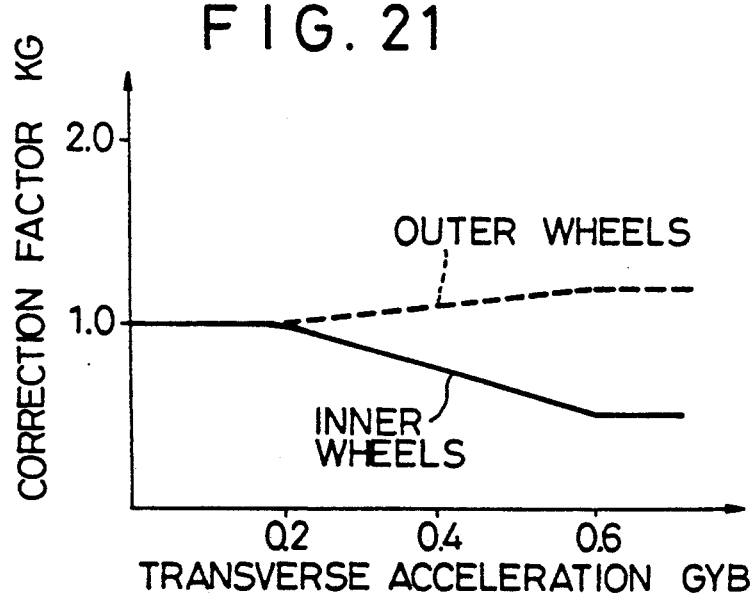
FIG. 21 shows a map for obtaining correction factor $K_G$.

Then, the controller 71 corrects the closing pressure $P_{OL}$ in accordance with the vehicle velocity sensor output $V_S$ and the helm sensor output H $\theta$ (Step S106). To attain this, the controller 71 calculates a transverse acceleration $G_{YB}$, which acts on the vehicle body, in conventional steps of procedure on the basis of the vehicle velocity $V_S$ and the helm H $\theta$, obtains a correction factor KG corresponding to the transverse acceleration $G_{YB}$ with reference to a map shown in FIG. 21, and corrects the closing pressure $P_{OL}$ according to the transverse acceleration by multiplying the closing pressure by the factor $K_G$. As shown in FIG. 21, the correction factor $K_G$ is set so that its values on the inner- and outer-wheel sides are equal when the transverse acceleration $G_{YB}$ is lower than 0.2 G, gradually increase and decrease, respectively, as the transverse acceleration $G_{YB}$ increases within a range from 0.2 G to 0.6 G, and are constant without regard to the value of the transverse acceleration when the transverse acceleration is higher than 0.6 G. The factor $K_G$ is set in this manner in consideration of the fact that if the vehicle turns more sharply, then the load correspondingly moves to the outer-wheel side so that the outer turning wheels can be locked less easily than the inner turning wheels.

Subsequently, the controller 71 further corrects the closing pressure $P_{OL}$ in accordance with the air temperature sensor output T and the windshield wiper operation period $T_P$ (Step S107). To attain this, the controller 71 makes a fuzzy inference in conventional steps of procedure on the basis of the conditions of detection, represented by the air temperature sensor output T and the windshield wiper operation period $T_P$ calculated from the rotary encoder output, and the nine fuzzy rules shown in FIG. 16. In doing this, a membership value for the detected air temperature associated with its corresponding one of the membership functions for the air temperature T (one item of antecedent) and a similar membership value for the windshield wiper operation period $T_P$ (another item of antecedent) are obtained with respect to each of the fuzzy rules. Then, in order to obtain an inference output on the basis of the max-min principle, the corresponding membership function for the correction value $\Delta P$ (item of consequent) is topcut with use of a smaller one of these membership values (adaption degrees), and a figure corresponding to the cut membership function is obtained. In order to make the inference output non-fuzzy, moreover, the center of gravity of a figure obtained by combining the figures corresponding individually to the nine rules is calculated as the correction value $\Delta P$. Finally, the correction value $\Delta P$ ($<0$) is added to the closing pressure $P_{OL}$ corrected according to the transverse acceleration in Step S106, whereby the closing pressure is further downwardly corrected. Thus, the closing pressure $P_{OL}$ can be rationalized according to the road surface conditions represented by the air temperature T and the windshield wiper operation period $T_P$.

If the road conditions are such that the air temperature T and the windshield wiper operation period $T_P$ are low and short, respectively, thus conforming to Rule 1, then it is supposed that the friction coefficient of the road surface is very low due to the highly possible freezing of the road surface or fallen snow thereon. In this case, the closing pressure $P_{OL}$ is sharply reduced to restrain the distribution of the rear wheel braking force. If the road conditions are such that the air temperature T and the windshield wiper operation period $T_P$ are nearly 0° C. and short or moderate, respectively, thus conforming to Rule 4 or 5, then it is supposed that the road surface is slippery, that is, its friction coefficient is low, due to a rainfall, and the closing pressure $P_{OL}$ is reduced to a moderate level. If the road conditions are such that the air temperature T and the windshield wiper operation period $T_P$ are high and moderate or long, respectively, thus conforming to Rule 8 or 9, then it is supposed that the road surface is dry, that is, its friction coefficient is high, and the closing pressure $P_{OL}$ is or is not reduced to a low level. In this case, the rear wheel braking force distribution is enhanced.

Figure 22:
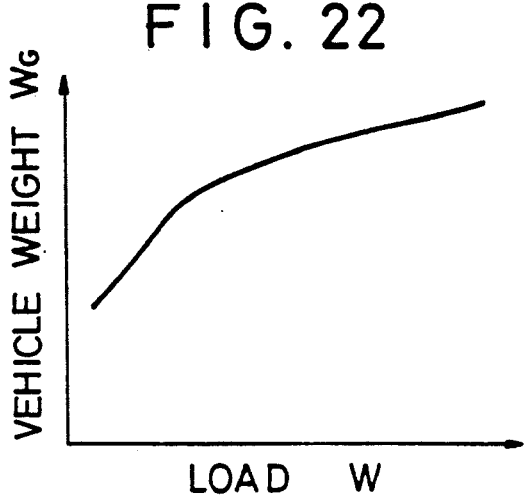
FIG. 22 shows a map for obtaining vehicle weight $W_G$.

Subsequently, the controller 71 obtains a vehicle weight $W_G$ corresponding to the load sensor output W with reference to a map shown in FIG. 22 (Step S108), and calculates a braking deceleration $G_X$ of the vehicle according to the following equation (Step S109):

$$G_X = \{(P_R + P_{OL})\cdot 4A\cdot \mu_R \cdot r\}/(W_G \cdot R),$$

where A, $\mu_R$, r and R are the wheel cylinder area, coefficient of friction between a friction material (not shown) and a rotor (not shown), effective brake diameter, and effective tire diameter, respectively.

Then, the controller 71 calculates variations of the respective velocities of the rear left and right wheels as wheel decelerations $W\alpha_R$ and $W\alpha_L$, in accordance with an output $V_{WS}$ of the wheel velocity sensor 83 for the rear wheels, inputted in Step S101 of the preceding control loop, and a similar output $V_{WS}$ inputted in the present control loop (Step S110), and obtains the larger one of these calculated values as a wheel deceleration $W\alpha$ (Steps S111 to S113). Then, the controller 71 determines whether or not the value of the wheel deceleration $W\alpha$ is equal to or larger than the sum ($= G_X + C$) of the braking deceleration $G_X$, calculated in Step S109, and a constant C (Step S114 of FIG. 19). If the decision in this step is negative, that is, if it is concluded that there is no possibility of the wheels slipping, the controller 71 further determines whether or not the closing pressure $P_{OL}$ is not higher than the master cylinder pressure $P_R$ (Step S115).

If the decision in Step S115 is negative, the controller 71 delivers, e.g., a low-level control output to the by-pass valves 62 and 63, and returns to Step S101 while keeping these valves open. If the by-pass valves 62 and 63 are kept open in this manner, the by-pass pipes 60 and 61 are opened, so that the brake fluid pressure from the master cylinder 53 is supplied to the wheel cylinders $55_3$ and $55_4$ for the rear left and right wheels. Thus, the wheel cylinders $55_3$ and $55_4$ can produce a greater braking force than in the case where the brake fluid pressure is supplied through the PCVs $57_1$ and $57_2$. If the decision in Step S115 is positive, on the other hand, the controller 71 delivers, e.g., a high-level control output to the by-pass valves 62 and 63 in Step S116, and returns to Step S101 after closing these valves. In this case, the brake fluid pressure from the master cylinder 53 is supplied to the wheel cylinders $55_3$ and $55_4$ through the PCVs $57_1$ and $57_2$, respectively, so that the PCVs $57_1$ and $57_2$ can fulfill their function to restrain the rate of increase of the brake fluid pressure. Thus, the rear wheel braking force is restricted to a lower level than in the case where the brake fluid pressure is supplied through the by-pass pipes 60 and 61.

Figure 23:
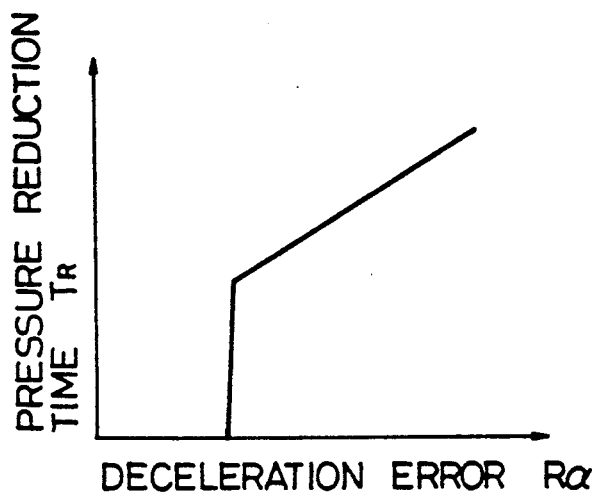
FIG. 23 shows a map for obtaining pressure reduction time $T_R$.

If it is concluded in Step S114 that there is the possibility of the wheels slipping, since the value of the wheel deceleration $W\alpha$ is not smaller than the sum of the braking deceleration $G_X$ and the constant C, the controller 71 subtracts the braking deceleration (estimated deceleration) $G_X$ from the wheel deceleration (actual deceleration) $W\alpha$, thereby obtaining a deceleration error $R\alpha$ which is indicative of the degree of locking (Step S117). Further, the controller 71 obtains a pressure reduction time $T_R$ corresponding to the deceleration error $R\alpha$ with reference to a map shown in FIG. 23 (Step S118), sets the time $T_R$ in a timer, and starts the timer (Step S119).

Then, the controller 71 delivers, e.g., a high-level control output to the reducing valve 64, which is formed of a normally-closed solenoid-operated valve (Step S120), and closes the by-pass valves 62 and 63 (Step S121). When the reducing valve 64 is opened so that the first cylinder chamber 203 of the balance piston mechanism 200 communicates with the low-pressure reservoir tank 53' by means of the valve 64, a high-pressure brake fluid supplied to the wheel cylinder $55_3$ for the rear left wheel is discharged into the tank 53' through the check valve 210, first cylinder chamber 203, and reducing valve 64. As a result, the brake fluid pressure acting on the wheel cylinder $55_3$ lowers. Further, the piston 202 moves to the left of FIG. 15 in the cylinder 201, resisting the urging force of the spring 205, under a differential pressure which is produced between the first and second cylinder chambers 203 and 204 as the pressure in the first cylinder chamber 203 lowers. Accordingly, the capacity of the second cylinder chamber 204 increases, and the high-pressure brake fluid supplied to the wheel cylinder $55_4$ for the rear right wheel flows into the chamber 204, so that the brake fluid pressure acting on the wheel cylinder $55_4$ lowers.

Immediately after the by-pass valves 62 and 63 are closed in Step S121, the controller 71 starts to monitor the timer output without interruption, thereby continuously discriminating the passage of the pressure reduction time $T_R$ (Step S122). If the passage of the time $T_R$ is discriminated, the controller 71 closes the reducing valve 64 (Step S123). As a result, the wheel cylinder pressures for the rear left and right wheels are reduced by the agency of the balance piston mechanism 200 and the reducing valve 64 for the pressure reduction time $T_R$, corresponding to the deceleration error $R\alpha$ which, indicative of the degree of locking, is obtained in Step S117. Thus, the rear wheels can be prevented from being locked.

Immediately after the reducing valve 64 is closed in Step S123, the controller 71 starts to monitor the output of the brake switch 78 without interruption, thereby continuously discriminating the end of the braking operation (Step S124). If the end of the braking operation is discriminated, the controller 71 allows the by-pass valves 62 and 63 and the reducing valve 64 to open for a predetermined time (Steps S125 and S126). As a result, the wheel cylinders $55_3$ and $55_4$ communicate with the upper-course side of the ducts 59 and 56, which are subjected to low pressure after the end of the braking operation, with respect to their corresponding PCVs by means of the by-pass circuits 60 and 61, respectively. Also, the first cylinder chamber 203 of the balance piston mechanism 200 communicates with the low-pressure reservoir tank 53' by means of the reducing valve 64, and the second cylinder chamber 204 with the upper-course side of the duct 56. Consequently, the internal pressure of each cylinder chamber lowers, so that the piston 202 of the balance piston mechanism 200 is urged toward the second cylinder chamber 204 by the urging force of the spring 205, thereby abutting against the stopper 206. Further, the brake fluid is supplied from the reservoir tank 53' to the first cylinder chamber 203.

Thereafter, the controller 71 repeatedly executes the process of Step S101 and its subsequent processes. Thus, if there is no possibility of the wheels slipping, the by-pass valves 62 and 63 are opened and closed depending on the relationships between the detected brake fluid pressure $P_R$ and the closing pressure $P_{OL}$, so that the rear wheel braking force distribution is rationalized. If there is the possibility of the wheels slipping, on the other hand, control is effected such that the rear wheel braking force distribution is lowered according to the degree of locking ($R\alpha$).

Since the wheel cylinder pressure is reduced on the lower-course side of the PCVs $57_1$ and $57_2$, the brake pedal 51 cannot be subjected to vibration caused by the pressure reduction. Since the check valve 210 is provided between the PCV $57_1$ and the first cylinder chamber 203 of the balance piston mechanism 200, moreover, the piston 202 cannot be moved in the cylinder 201 by a differential pressure, if any, between the first and second cylinder chambers. Accordingly, the closing pressure $P_{OL}$, which is adjusted to one value on the outer-wheel side and to another on the inner-wheel side when the vehicle turns, cannot be neutralized due to the change of the brake fluid pressure which is caused by the movement of the piston. Thus, due to the correction according to the transverse acceleration in Step S106, the one by-pass valve 62 or 63 which corresponds to the outer turning wheels is closed under a higher master cylinder pressure, while the other one which corresponds to the inner turning wheels is closed under a lower master cylinder pressure.

Figure 24:
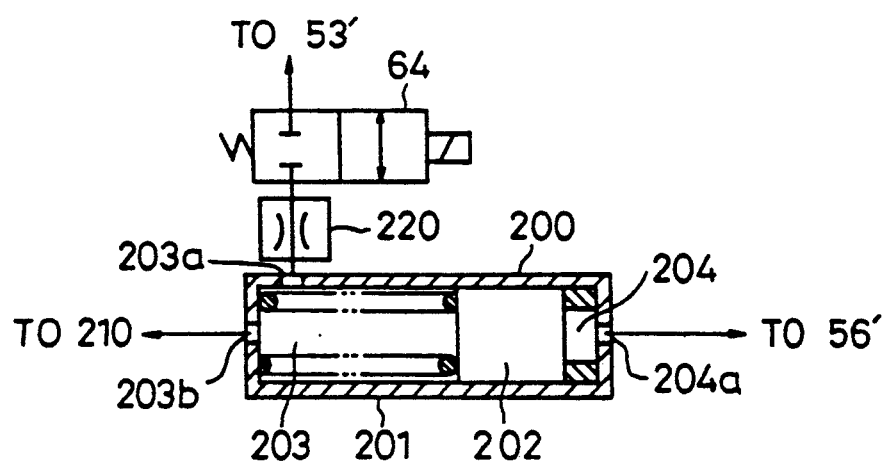
FIG. 24 is a partial view showing the principal part of a modification of the apparatus of the second embodiment.

FIG. 24 shows the principal part of a modification of the apparatus according to the second embodiment. In the apparatus of this modification, a constriction 220 is disposed in the middle of a duct which connects the first port 203a of the balance piston mechanism 200 and the reducing valve 64 so that the pressure reducing operation by means of the valve 64 and the like can be performed in multiple stages if there is the possibility of the rear wheels slipping. Except for the constriction 220, the apparatus of this modification is constructed in the same manner as the apparatus of the second embodiment, so that a detailed description of its construction is omitted.

Figure 25:
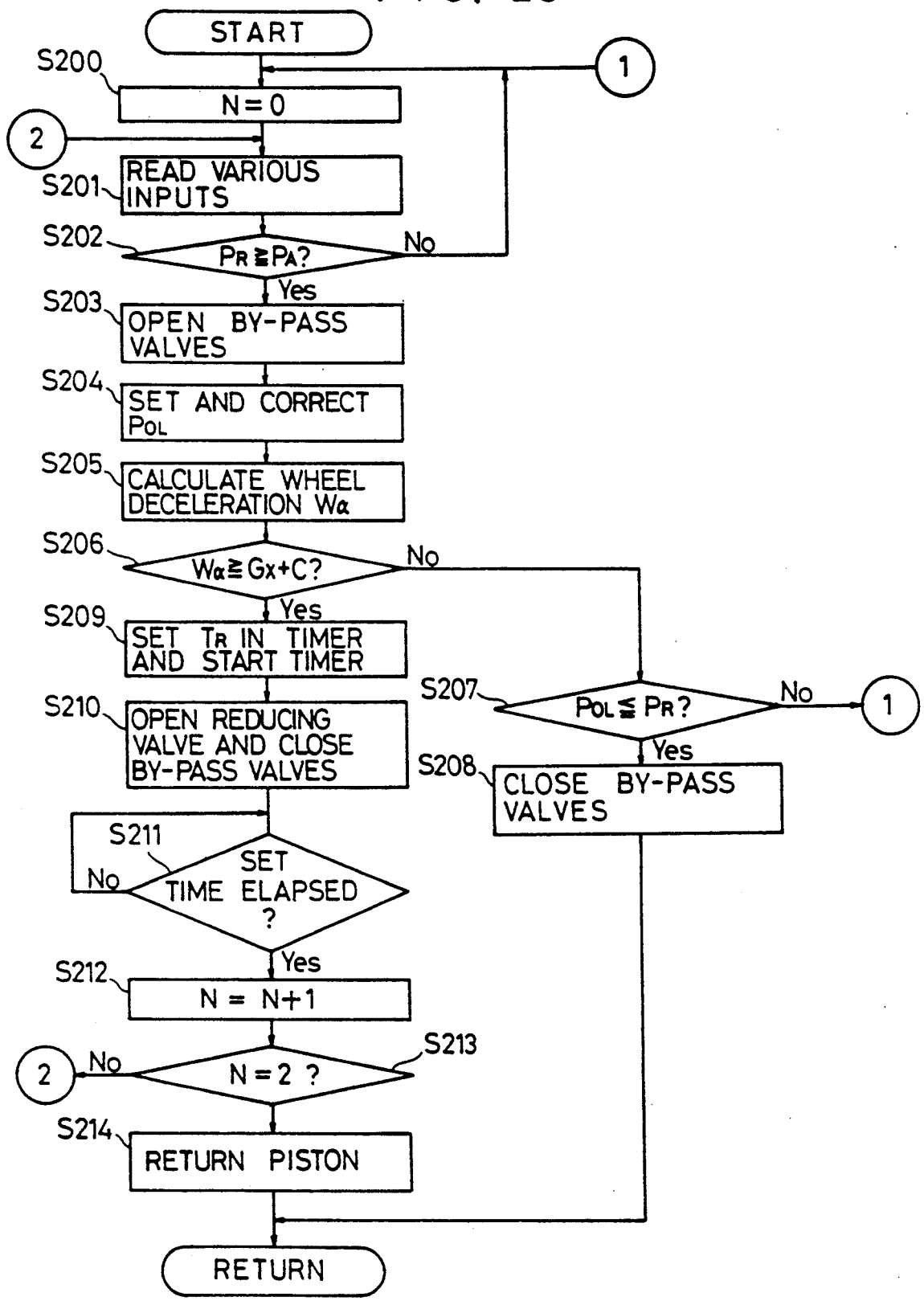
FIG. 25 is a flow chart showing control processes for the apparatus of the modification partially shown in FIG. 24.

Referring now to FIG. 25, the operation of the apparatus of the modification will be described.

The controller 71 resets a count value N in a counter (not shown), which is indicative of the frequency of execution of the multistage pressure reducing operation by means of the reducing valve 64 and the like, at zero (Step S200), and then successively executes Steps S201 and S202 which correspond to Steps S101 and S102, respectively, of FIG. 18. If it is concluded in Step S202 that the value of the detected master cylinder pressure $P_R$ is not smaller than the predetermined value $P_A$, the controller 71 opens the by-pass valves 62 and 63 in Step S203 which corresponds to Step S103. Then, the controller 71 sets and corrects the closing pressure $P_{OL}$ in Step S204 which corresponds to Steps S104 to S107, calculates the wheel deceleration $W\alpha$ in Step S205 which corresponds to Steps 108 to S113, and determines whether or not the value of the wheel deceleration $W\alpha$ is equal to or larger than the sum of the braking deceleration $G_X$ and the constant C, in Step S206 which corresponds to Step S114 of FIG. 19. If the decision in this step is negative, the controller 71 further determines whether or not the closing pressure $P_{OL}$ is not higher than the master cylinder pressure $P_R$ (Step S207). If the decision in Step S207 is negative, the controller 71 returns to Step S200 while keeping the by-pass valves 62 and 63 open. If the decision in Step S207 is positive, on the other hand, the controller 71 returns to Step s200 after closing the by-pass valves 62 and 63.

Figure 26:
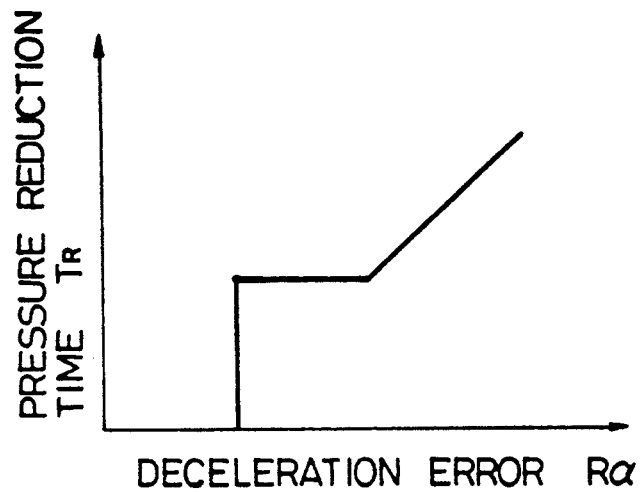
FIG. 26 shows a map for obtaining pressure reduction time $T_R$ used in the control shown in FIG. 25.

If it is concluded in Step S206 that the value of the wheel deceleration $W\alpha$ is not smaller than the sum of the braking deceleration $G_X$ and the constant C, the controller 71 sets the pressure reduction time $T_R$, corresponding to the deceleration error $R\alpha$ which is indicative of the degree of locking, in the timer with reference to a map shown in FIG. 26, and starts the timer, in Step S209 which corresponds to Steps S117 to S119 of FIG. 19. In Step S210 which corresponds to Steps S120 and S121, moreover, the controller 71 opens the reducing valve 64 and closes the by-pass valves 62 and 63. Then, if the passage of the time $T_R$ is discriminated in Step S211 which corresponds to Step S122, the controller 71 closes the reducing valve 64, and updates the count value by "1" in Step S212. Further, in Step S213, the controller 71 determines whether or not the updated count value N is equal to a predetermined frequency of execution of the pressure reducing operation, e.g., 2. Since the pressure reducing operation is executed only once in this case, the controller 71 returns to Step S201, and executes the process of Step S201 and its subsequent processes.

If the possibility of the wheels slipping is removed by one cycle of the pressure reducing operation, the decision in Step S206 executed thereafter is negative, so that the pressure reducing operation is not executed again. Thus, the wheels can be prevented from slipping by only one pressure reducing operation cycle, depending on the road surface conditions. In this case, the controller 71 returns at once to distribution control based on the result of comparison between the detected master cylinder pressure $P_R$ and the closing pressure $P_{OL}$, and enhances the rear wheel braking force distribution as required.

If the possibility of the wheels slipping is not removed by the one cycle of the pressure reducing operation, on the other hand, the pressure reducing operation is executed again (Steps S209 to S211). In this case, the count value N is updated to "2" in the next step or Step S212, so that the decision in Step S213 is positive. Thus, a piston returning operation is performed such that the piston 202 of the balance piston mechanism 200 abuts against the stopper 206, in Step S214 which corresponds to Steps S124 to S126 of FIG. 19.

Thereafter, the controller 71 repeatedly executes the process of Step S200 and its subsequent processes. Thus, if there is no possibility of the wheels slipping, the by-pass valves 62 and 63 are opened and closed depending on the relationships between the detected brake fluid pressure $P_R$ and the closing pressure $P_{OL}$, so that the rear wheel braking force distribution is rationalized. If there is the possibility of the wheels slipping, on the other hand, the reducing valve 64 and the like are controlled so that the rear wheel braking force distribution is lowered according to the degree of locking ($R\alpha$).

Figure 27:
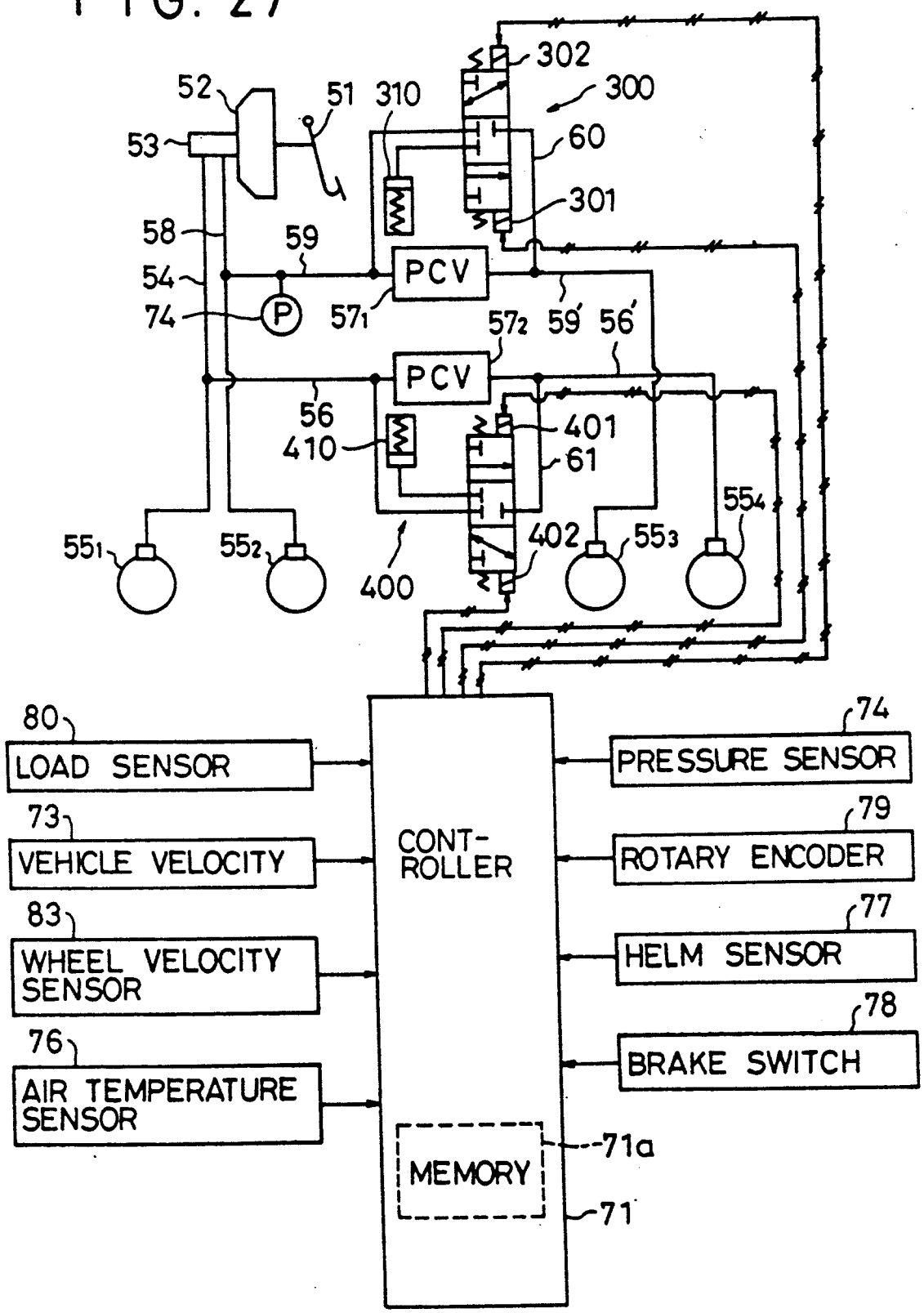
FIG. 27 is a schematic view showing a braking system furnished with a rear wheel braking force control apparatus according to a third embodiment of the invention.

Referring now to FIG. 27, a rear wheel braking force control apparatus according to a third embodiment of the present invention will be described.

In the apparatus of the second embodiment, the rear wheels are prevented from being locked by the use of the reducing valve 64 and the balance piston mechanism 200 which are common to the wheel cylinders 55₃ and 55₄ for the rear left and right wheels. The apparatus of the third embodiment differs from the apparatus of the second embodiment mainly in that it is provided with two three-position three-way valves which correspond individually to the rear wheel cylinders 55₃ and 55₄ and each of which serves as a reducing valve and a by-pass valve.

As shown in FIG. 27, the apparatus of the present embodiment comprises two three-position three-way valves 300 and 400 and two reservoirs 310 and 410. The three-way valve 300 has a first port communicating with the master cylinder 53 by means of the by-pass circuit 60 and the duct 59, a second port communicating with the reservoir 310, and a third port communicating with the wheel cylinder 55₃ for the rear left wheel by means of the by-pass circuit 60 and the duct 59 (59'). Further, the valve 300 has first and second solenoids 301 and 302 which are connected to the controller 71. When both these solenoids are off, the first to third ports are cutt off from one another. When the first solenoid 301 is energized, the first and third ports communicate with each other, thereby opening the by-pass circuit 60. When the second solenoid 302 is energized, the second and third ports communicate with each other, thereby connecting the wheel cylinder 55₃ to the reservoir 310. Likewise, the three-way valve 400 has a first port communicating with the master cylinder 53 by means of the by-pass circuit 61 and the duct 56, a second port communicating with the reservoir 410, and a third port communicating with the wheel cylinder 55₄ for the rear right wheel by means of the by-pass circuit 61 and the duct 56 (56'). When both of first and second solenoids 401 and 402, which are connected to the controller 71, are off, the first to third ports are cut off from one another. When the first solenoid 401 is energized, the by-pass circuit 61 is opened. When the second solenoid 402 is energized, the wheel cylinder 55₄ is connected to the reservoir 410.

Figure 28:
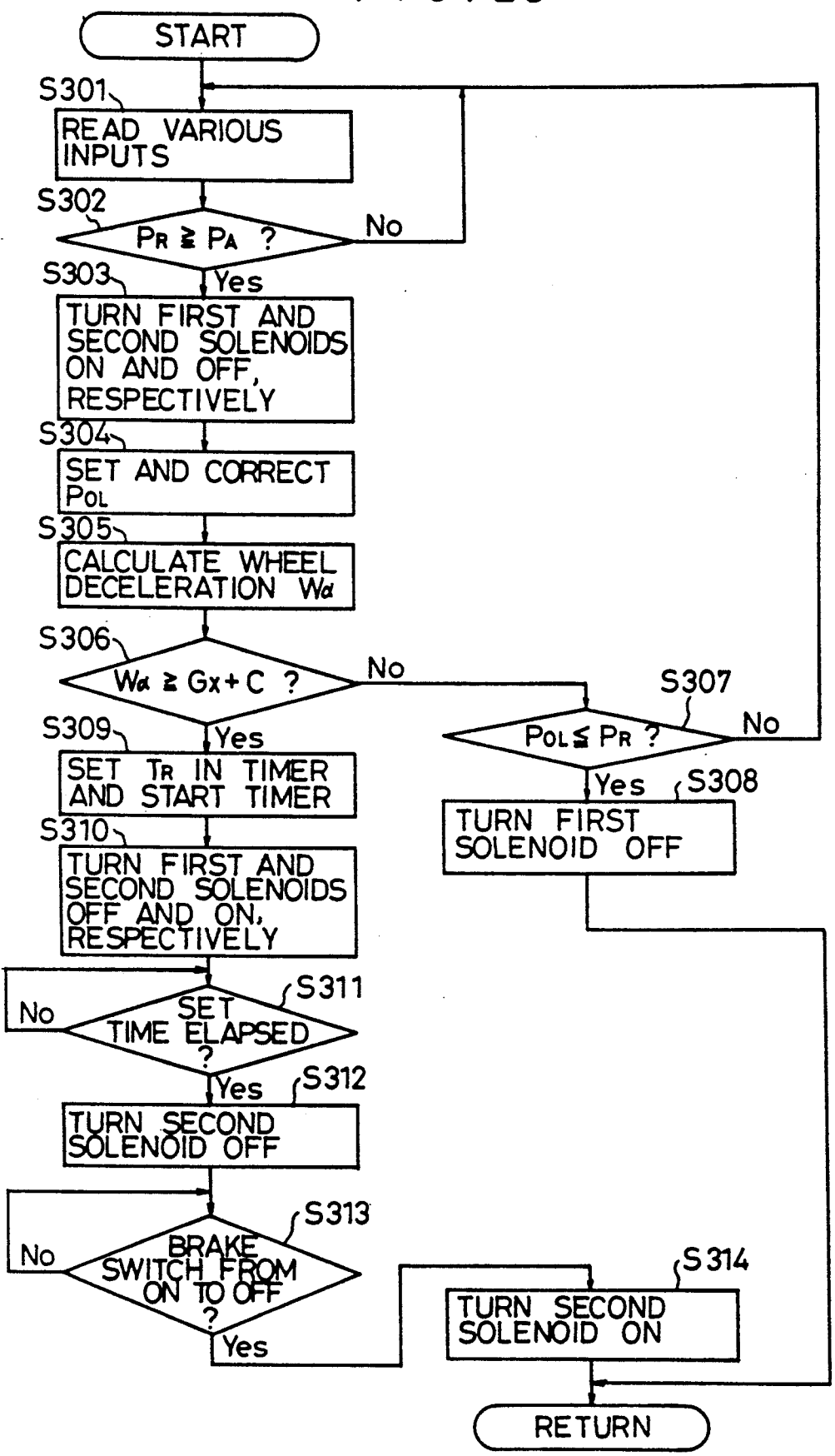
FIG. 28 is a flow chart showing control processes for the control apparatus shown in FIG. 27.

The operation of the rear wheel braking force control apparatus shown in FIG. 27 operates basically in the same manner as the operation of the apparatuses of the second embodiment and the modification thereof. Referring now to FIG. 28, the operation of the apparatus of FIG. 27 will be described in brief.

As shown in FIG. 28, the controller 71 successively executes Steps S301 and S302 which correspond to Steps S101 and S102, respectively, of FIG. 18. If it is concluded in Step S302 that the value of the detected master cylinder pressure $P_R$ is not smaller than the predetermined value $P_A$, the controller 71 energizes the respective first solenoids 301 and 401 of the three-way valves 300 and 400, thereby opening the by-pass circuits 60 and 61, in Step S303 which corresponds to Step S103. In this case, the second solenoids 302 and 402 are de-energized. Then, the controller 71 sets and corrects the closing pressure $P_{OL}$ in Step S304 which corresponds to Steps S104 to S107, calculates the wheel deceleration $W\alpha$ in Step S305 which corresponds to Steps 108 to S113, and determines whether or not the value of the wheel deceleration $W\alpha$ is equal to or larger than the sum of the braking deceleration $G_X$ and the constant C, in Step S306 which corresponds to Step S114 of FIG. 19.

If the decision in Step S306 is negative, the controller 71 further determines whether or not the closing pressure $P_{OL}$ is not higher than the master cylinder pressure $P_R$ (Step S307). If the decision in Step S307 is negative, the controller 71 returns to Step S301 while keeping the first solenoids 301 and 401 on and the by-pass circuits 60 and 61 open. If the decision in Step S307 is positive, on the other hand, the controller 71 returns to Step S301 after de-energizing the first solenoids 301 and 401, thereby closing the by-pass circuits 60 and 61.

If it is concluded in Step S306 that the value of the wheel deceleration $W\alpha$ is not smaller than the sum of the braking deceleration $G_X$ and the constant C, the controller 71 sets the pressure reduction time $T_R$, corresponding to the deceleration error $R\alpha$ which is indicative of the degree of locking, in the timer, and starts the timer, in Step S309 which corresponds to Steps S117 to S119 of FIG. 19. In Step S310 which corresponds to Steps S120 and S121, moreover, the controller 71 de-energizes the first solenoids 301 and 401, and energizes the second solenoids 302 and 402. As a result, the by-pass circuits 60 and 61 communicate with the reservoirs 310 and 410, respectively, on the side of the rear wheel cylinders. Then, if the passage of the time $T_R$ is discriminated in Step S311 which corresponds to Step S122, the controller 71 de-energizes the second solenoids 302 and 402 (Step S312).

Thereafter, if it is determined in Step S313, which corresponds to Step S124 of FIG. 19, that the braking operating is finished so that the brake switch output is turned off, the controller 71 energizes the second solenoids 302 and 303 for a predetermined time, and causes the rear wheel cylinders 55₃ and 55₄ to communicate with the reservoirs 310 and 410, respectively.

Figure 30:
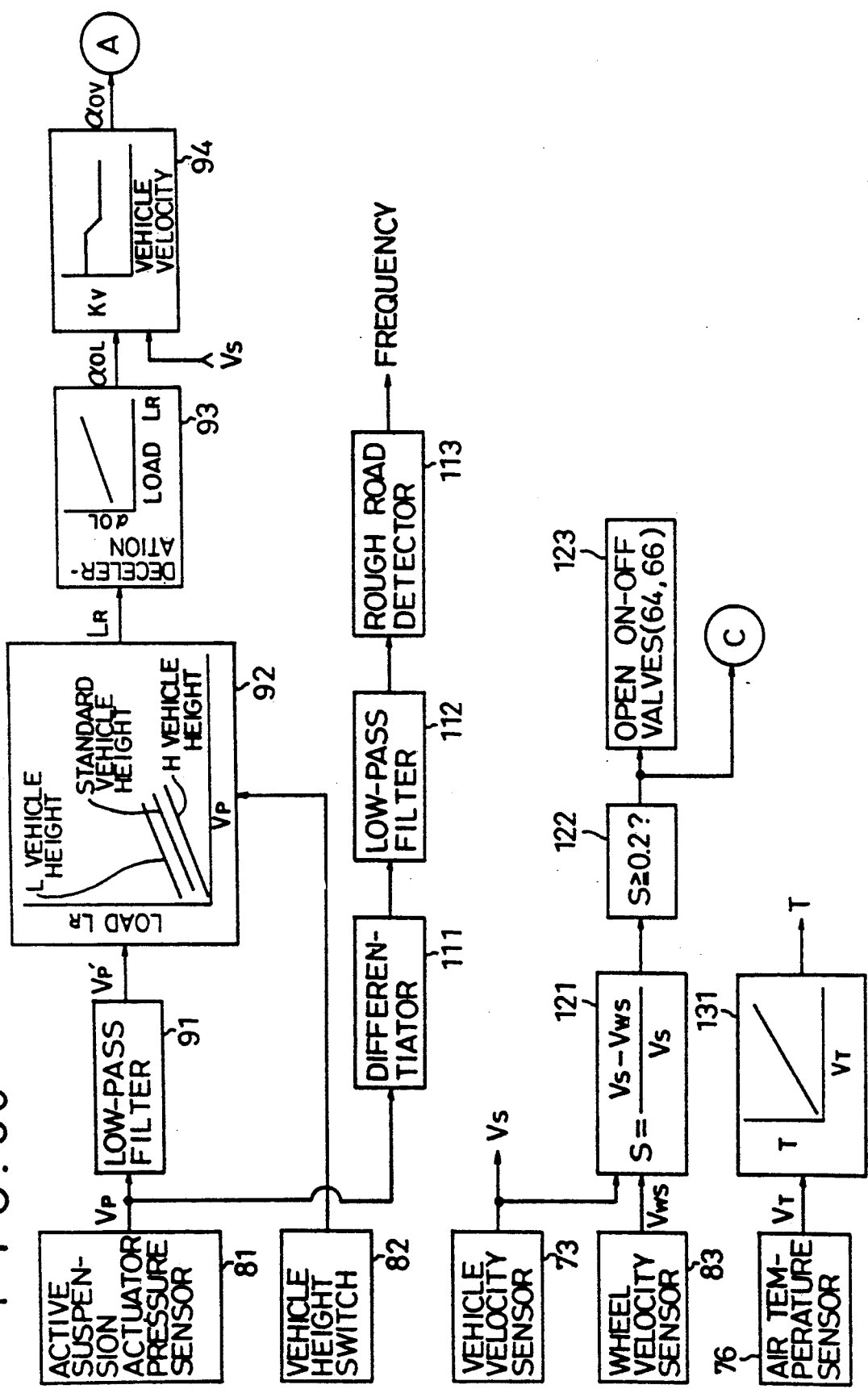
FIG. 30 a function block diagram showing a part of the contents of a control apparatus according to a fourth embodiment of the invention.
Figure 31:
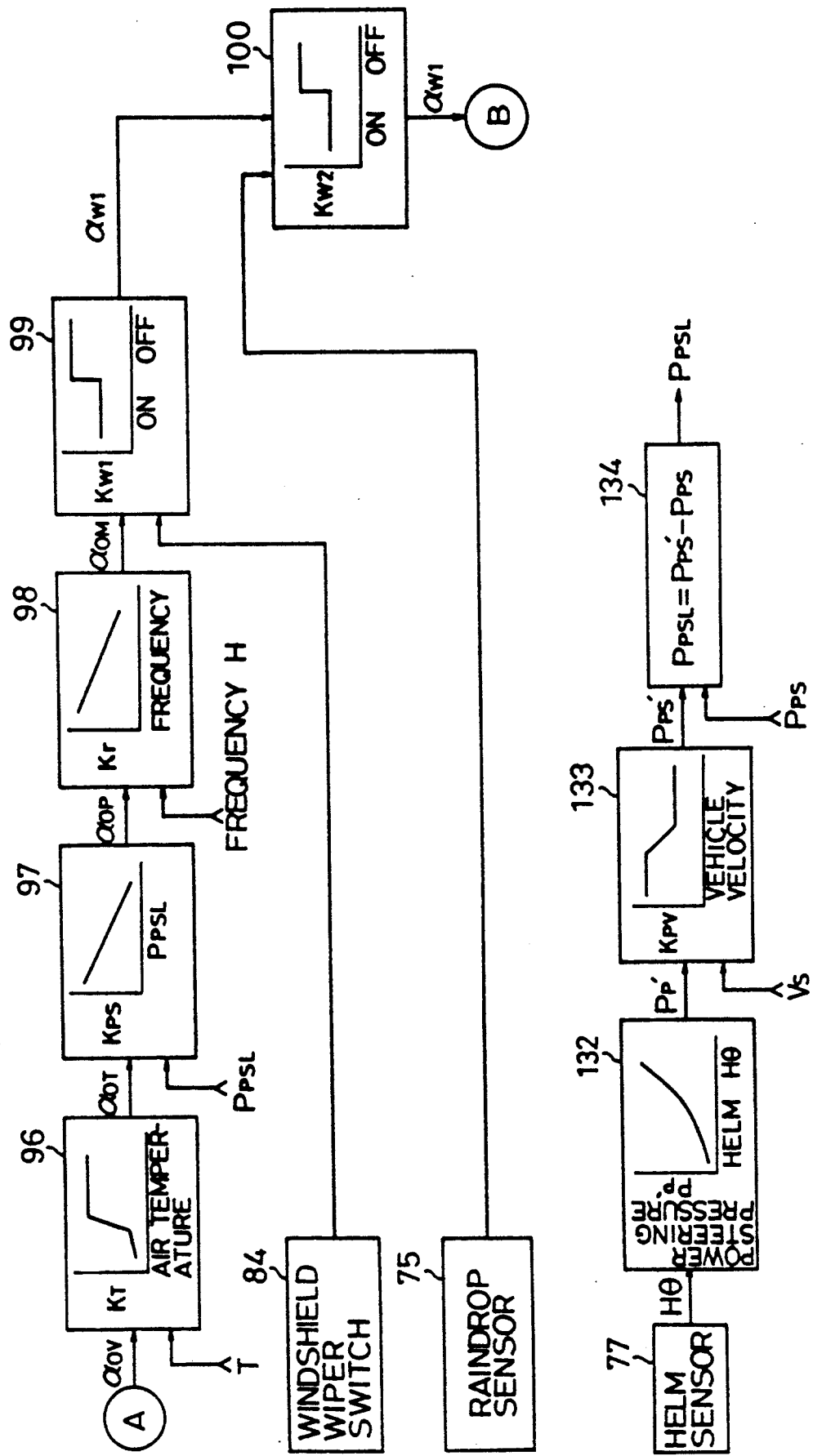
FIG. 31 is a function block diagram showing another part of the control contents partially shown in FIG. 30.
Figure 32:
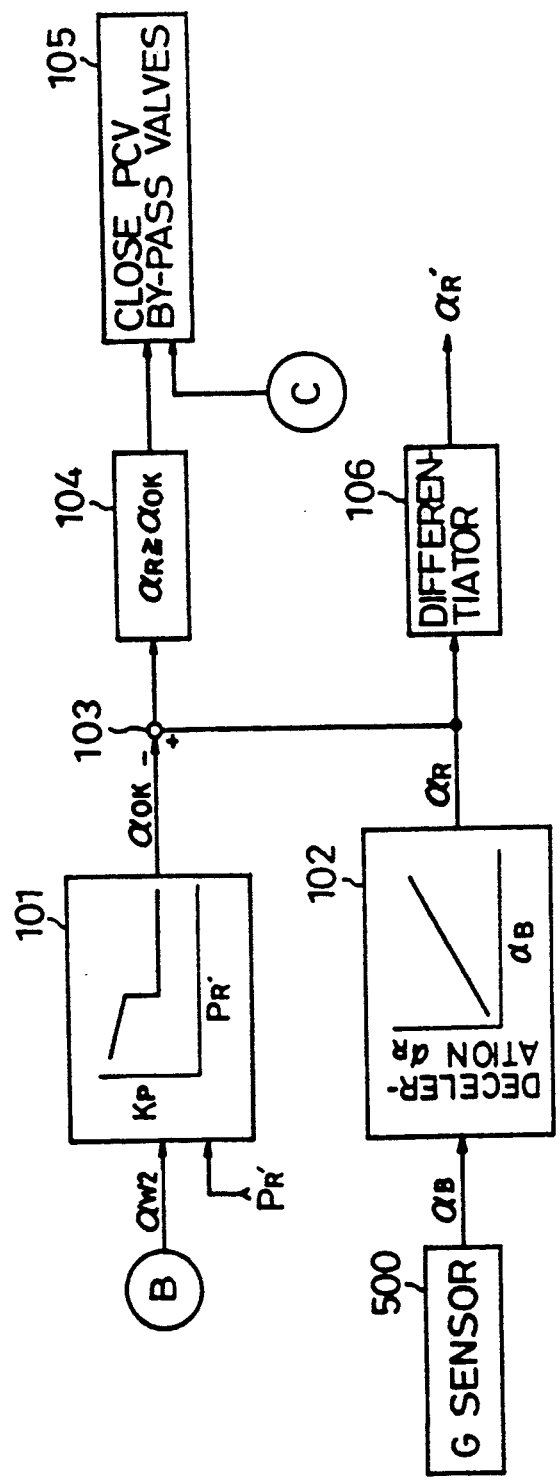
FIG. 32 is a function block diagram showing still another part of the control contents partially shown in FIGS. 30 and 31.

Referring now to FIGS. 30 to 32, a rear wheel braking force control apparatus according to a fourth embodiment of the present invention will be described.

In the apparatus of the present embodiment, an acceleration sensor (G sensor) 500 as braking degree detecting means is used in place of the pressure sensor 74 used in the first embodiment. The G sensor 500 serves to detect the deceleration of the vehicle body. The processes shown in FIGS. 30 to 32 are executed in the controller 71. In these processes, vehicle body decelerations $\alpha$ B and $\alpha$ R, which are detected by means of the G sensor 500, and closing decelerations $\alpha_{OL}$, $\alpha_{OV}$, $\alpha_{OT}$, $\alpha_{OP}$, $\alpha_{OM}$, $\alpha_{W1}$, $\alpha_{W2}$ and $\alpha_{OK}$, which are set in the controller 71, are used in place of the brake fluid pressures $V_B$ and $P_R$ and the closing pressures $P_{OL}$, $P_{OV}$, $P_{OT}$, $P_{OP}$, $P_{OM}$, $P_{W1}$, $P_{W2}$ and $P_{OK}$, respectively, according to the first embodiment. Since the contents of processing are substantially the same as those for the case of the first embodiment, a detailed description of these contents is omitted.

According to the apparatus of the present embodiment, when the deceleration $\alpha$ of the vehicle body attains the predetermined value $\alpha_{OK}$, the PCV by-pass valves 62 and 63 are closed, and the proportioning control valves 57₁ and 57₂ fulfill their functions. Thus, the same effect of the first embodiment can be obtained.

It is to be understood that the present invention is not limited to the first to fourth embodiments described above, and that various changes and modifications may be effected therein by one skilled in the art without departing from the scope or spirit of the invention.

Figure 9:
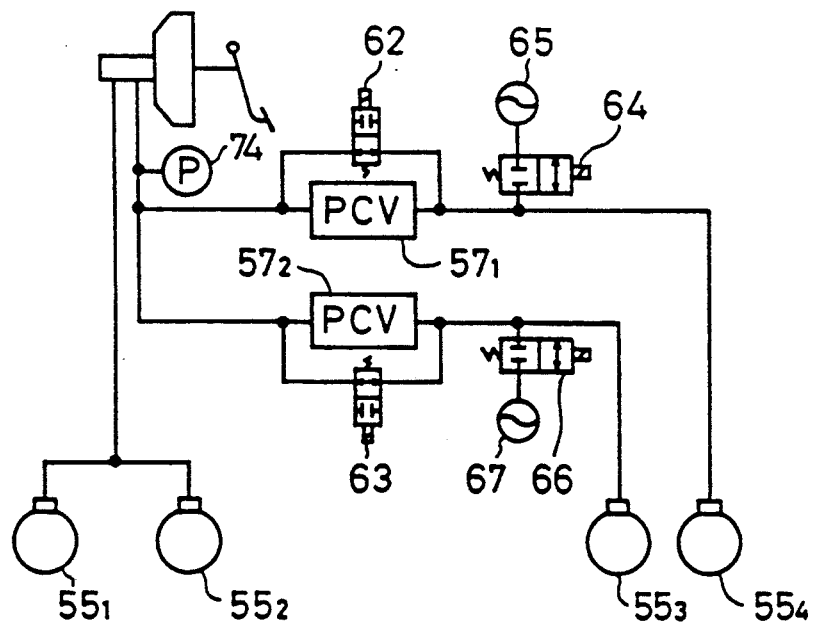
FIG. 9 is a piping system diagram associated with a modification of the first embodiment.
Figure 29:
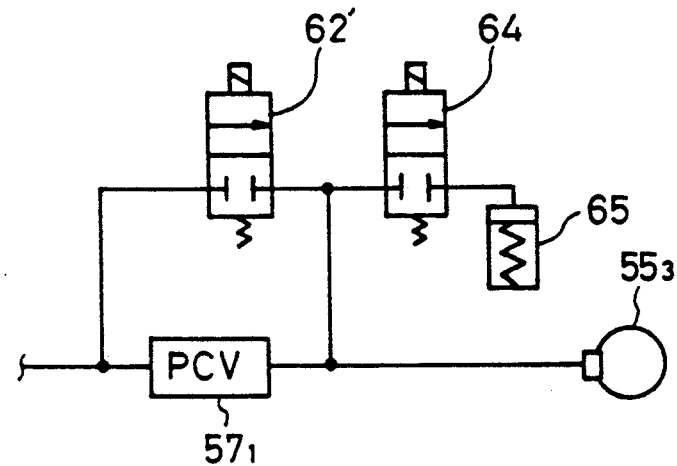
FIG. 29 is a partial view showing the principal part of another modification of the first embodiment.

Instead of using the X-piping configuration described in connection with the first embodiment, for example, a valve arrangement such as the one shown in FIG. 9 may be applied to front and rear piping systems which are generally used in an FR car. Moreover, normally-closed by-pass valves may be used in place of the normally-open by-pass valves 62 and 63 used in the first embodiment. FIG. 29 shows a normally-closed by-pass valve 62', which replaces the normally-open by-pass valve 62, along with its peripheral elements. Also, valves of any other types or properties may be used as the proportioning control valves. Further, sensors of any other types may be used as the braking condition detecting means, the set pressure may be varied in stages, and the sensors used may be reduced in number. Furthermore, the utilization of the vehicle body deceleration, described in connection with the fourth embodiment, may be also applied to the second and third embodiments in like manner.

What is claimed is:

1. A rear wheel braking force control apparatus for a vehicle, having at least one proportioning control valve arranged in a first passage connecting a master cylinder and wheel cylinders for rear left and right wheels of the vehicle for controlling a wheel cylinder pressure so that a rate of increase of the wheel cylinder pressure is lower than that of a master cylinder pressure, at least one solenoid-operated valve provided in the first passage for selectively making a pressure control action of the at least one proportioning control valve effective or ineffective, and a control device for controlling an operation of the at least one solenoid-operated valve, said control apparatus comprising:

braking degree detecting means for detecting a degree of braking of the vehicle;

braking condition detecting means for detecting braking conditions of the vehicle which influence a level of a locking limit of at least one of the rear wheels, said control means being adapted to determine a set braking degree in accordance with the level of the locking limit of the at least one rear wheel discriminated based upon a detection output of said braking condition detecting means, to actuate the at least one solenoid-operated valve so that the action of the at least one proportioning control valve is made ineffective when the braking degree detected by said braking degree detecting means is lower than the set braking degree, and to actuate the at least one solenoid-operated valve so that the action of the at least one proportioning control valve is made effective when the detected braking degree is higher than the set braking degree;

locking tendency detecting means for detecting a tendency for the at least one rear wheel to be locked;

a reservoir communicating with a second passage constituting a part of the first passage and connecting the wheel cylinders and the at least one proportioning control valve; and a reducing valve for selectively allowing or preventing the communication between the second passage and the reservoir, said control means being adapted to keep the reducing valve closed in a normal state and to open said reducing valve when the tendency for the at least one rear wheel to be locked is detected by said locking tendency detecting means.

2. An apparatus according to claim 1, wherein said reservoir is an accumulator.

3. An apparatus according to claim 1, wherein said reservoir is a reservoir tank of the master cylinder.

4. An apparatus according to claim 1, wherein a constriction is provided in the middle of a passage connecting said second passage and said reducing valve.

5. An apparatus according to claim 1, wherein said at least one proportioning control valve and said at least one solenoid-operated valve are provided for each of the rear left and right wheels, and said reducing valve is provided for only one of the left and right rear wheels, said apparatus further including a balance piston mechanism including a piston slidably disposed in a cylinder and defining two cylinder chambers in conjunction with the cylinder, said balance piston mechanism being arranged so that the reducing valve and that side of the second passage which corresponds to one of the rear wheels communicate with each other by means of one of the two cylinder chambers, and that the other of the two cylinder chambers communicates with that side of the second passage which corresponds to the other rear wheel.

6. An apparatus according to claim 5, wherein a check valve is disposed between said one cylinder chamber and that side of said second passage which corresponds to the one rear wheel, said check valve allowing brake fluid to flow only from the wheel-cylinder side toward the one cylinder chamber.

7. An apparatus according to claim 6, wherein said balance piston mechanism further includes stopper means for restraining the piston from moving toward the other cylinder chamber and a spring for urging the piston so that the piston abuts against the stopper means.

8. An apparatus according to claim 1, wherein said at least one solenoid-operated valve is an on-off valve provided in a by-pass for transmitting the master cylinder pressure to at least one of the wheel cylinders in a manner such that the at least one proportioning control valve is by-passed.

9. An apparatus according to claim 8, wherein said reservoir is in communication with the second passage by means of the by-pass, and said reducing valve is interposed between the by-pass and the reservoir.

10. An apparatus according to claim 9, wherein said detecting means and said at least one solenoid-operated valve are integrally formed of a three-way valve provided in the middle of the by-pass and includes two ports communicating with the by-pass and one port communicating with the reservoir.

11. An apparatus according to claim 1, wherein said braking degree detecting means detects the master cylinder pressure, and said control means uses a set pressure as the set braking degree, and controls the at least one solenoid-operated valve on the basis of comparison between the detected master cylinder pressure and the set pressure.

12. An apparatus according to claim 11, wherein said braking degree detecting means detects a fluid pressure in the first passage.

13. An apparatus according to claim 1, wherein said braking degree detecting means detects a deceleration of a body of the vehicle, and said control means uses a set deceleration as the set braking degree, and controls the at least one solenoid-operated valve on the basis of comparison between the detected deceleration and the set deceleration.

14. An apparatus according to claim 1, wherein said braking condition detecting means includes rainfall detecting means for detecting presence/absence of a rainfall, and said control means adjusts the set braking degree to a low level upon detecting presence of a rainfall.

15. An apparatus according to claim 1, wherein said braking condition detecting means includes air temperature detecting means for detecting an air temperature, said control means adjusts the set braking degree to a low level upon detecting a low air temperature.

16. An apparatus according to claim 1, wherein said braking condition detecting means includes rear wheel load detecting means for detecting a load on the rear wheels, and said control means adjusts the set braking degree to a high level upon detecting a large rear wheel load.

17. An apparatus according to claim 1, wherein said braking condition detecting means includes road surface friction coefficient detecting means for detecting a friction coefficient of a road surface, and said control means adjusts the set braking degree to a low level upon detecting a low friction coefficient of the road surface.

18. An apparatus according to claim 1, wherein said braking condition detecting means includes rough road detecting means for detecting a rough road, and said control means adjusts the set braking degree to a low level upon detecting the rough road.

19. An apparatus according to claim 1, wherein said braking condition detecting means includes hard braking detecting means for detecting hard braking operation, and said control means adjusts the set braking degree to a low level upon detecting the hard braking operation.

20. An apparatus according to claim 1, wherein said locking tendency detecting means detects a slip factor of the at least one rear wheel, and said control means opens the reducing valve when the detected slip factor is not lower than a predetermined value.

21. An apparatus according to claim 1, wherein said locking tendency detecting means detects deceleration of the at least one rear wheel, and said control means opens the reducing valve when the detected deceleration is not lower than a predetermined value.

22. An apparatus according to claim 21, wherein said apparatus further includes means for detecting or estimating deceleration of a body of the vehicle, and wherein said control means determines the predetermined value in accordance with the detected or estimated vehicle body deceleration.

23. An apparatus according to claim 1, wherein said control means actuates the at least one solenoid-operated valve so that the action of the at least one proportioning control valve is made effective when the reducing valve is opened.

24. An apparatus according to claim 1, wherein said control means opens the reducing valve only for a predetermined time.

25. An apparatus according to claim 24, wherein said apparatus further includes means for detecting deceleration of at least one of the rear wheels and means for detecting or estimating deceleration of a body of the vehicle, and said control means sets the predetermined time in accordance with a difference between the detected rear wheel deceleration and the detected or estimated vehicle body deceleration.

26. An apparatus according to claim 1, wherein said apparatus further includes means for detecting turning of the vehicle, and wherein said at least one proportioning control valve and said at least one solenoid-operated valve are provided for each of the rear left and right wheels, and said control means corrects the set braking degree in accordance with the detected turning of the turning detecting means so that the set braking degree for the at least one solenoid-operated valve on a vehicle side of the outer turning wheels is higher than that for the at least one solenoid-operated valve on a vehicle side of the inner turning wheels when the vehicle turns.

27. An apparatus according to claim 1, wherein said apparatus further includes braking operation detecting means for detecting an operation of a brake pedal, and wherein said control means opens the reducing valve for a predetermined time after the braking operation detecting means ceases to detect the operation of the brake pedal.

28. A rear wheel braking force control method for a vehicle, for controlling an operation of at least one solenoid-operated valve arranged in a first passage connecting a master cylinder and wheel cylinders for rear left and right wheels of the vehicle, the at least one solenoid-operated valve being operable to selectively make an action of at least one proportioning control valve effective or ineffective, the at least one proportioning control valve being provided in the first passage and being operable to control a wheel cylinder pressure so that a rate of increase of the wheel cylinder pressure is lower than that of a master cylinder pressure, and for controlling an operation of a reducing valve for selectively allowing or preventing a reservoir to be in communication with a second passage constituting a part of the first passage and connecting the wheel cylinders and the at least one proportioning control valve, said control method comprising the steps of:
(a) detecting a degree of braking of the vehicle;
(b) detecting braking conditions of the vehicle which influence a level of a locking limit of at least one of the rear wheels;
(c) detecting a tendency for the at least one rear wheel to be locked;
(d) determining a set braking degree in accordance with the level of the locking limit of the at least one rear wheel discriminated based upon the braking conditions detected in said step (b);
(e) actuating the at least one solenoid-operated valve so that the action of the at least one proportioning control valve is made ineffective when the braking degree detected in said step (a) is lower than the set braking degree, and actuating the at least one solenoid-operated valve so that the action of the at least one proportioning control valve is made effective when the detected braking degree of said step (a) is higher than the set braking degree; and
(f) keeping the reducing valve closed in a normal state and opening the reducing valve when the tendency for the at least one rear wheel to be locked is detected in said step (c).

* * * * *

UNITED STATES PATENT AND TRADEMARK OFFICE
CERTIFICATE OF CORRECTION

PATENT NO. : 5,302,007
DATED : April 12, 1994
INVENTOR(S) : Takao MORITA et al.

It is certified that error appears in the above-identified patent and that said Letters Patent is hereby corrected as shown below:

On the title page, item [73] please change the Assignee from "Mitsubishi Jidosha Kogue Kabushiki Kaisha" to --Mitsubishi Jidosha Kogyo Kabushiki Kaisha--.

Signed and Sealed this

Twenty-fifth Day of October, 1994

*Attest:*

BRUCE LEHMAN

*Attesting Officer*     *Commissioner of Patents and Trademarks*